United States Patent [19]
Cobb et al.

[11] 4,431,404
[45] Feb. 14, 1984

[54] METHOD AND APPARATUS FOR HEATING PLASTIC SHEET MATERIAL

[75] Inventors: John F. Cobb, Van Buren, Ark.; John W. Martin, Drexel Hill, Pa.

[73] Assignee: Whirlpool Corporation, Benton Harbor

[21] Appl. No.: 411,532

[22] Filed: Aug. 26, 1982

[51] Int. Cl.³ .................. F27D 3/00; F27D 3/04; F26B 9/04
[52] U.S. Cl. .................. 432/11; 34/144; 414/37; 414/127; 414/131; 414/152; 414/331; 432/125
[58] Field of Search ............. 432/125, 11; 34/144, 34/146; 414/37, 127, 131, 138, 152, 331

[56] References Cited

U.S. PATENT DOCUMENTS

| | | | |
|---|---|---|---|
| 1,463,895 | 8/1923 | Kehr | 34/144 |
| 1,658,957 | 2/1928 | Whitney et al. | 187/95 |
| 1,776,201 | 9/1930 | St. Clair et al. | 414/152 |
| 2,465,511 | 3/1949 | Campion | 432/6 |
| 2,536,756 | 1/1951 | Lopez | 414/152 |
| 2,614,590 | 10/1952 | Hervey | 144/281 |
| 2,661,831 | 12/1953 | Kenney | 198/435 |
| 2,671,160 | 3/1954 | Segsworth | 219/10.41 |
| 2,735,461 | 2/1956 | Pater | 144/281 |
| 3,074,595 | 1/1963 | Boller | 221/221 |
| 3,137,485 | 6/1964 | Johnson et al. | 432/52 |
| 3,171,550 | 3/1965 | Gajdostik et al. | 414/37 |
| 3,367,043 | 2/1968 | Torigian | 34/193 |
| 3,388,817 | 6/1968 | Johnson | 414/127 |
| 3,502,310 | 3/1970 | Coffman | 432/10 |
| 3,523,617 | 8/1970 | Raynor et al. | 414/127 |
| 3,684,258 | 8/1972 | Coffman et al. | 432/11 |
| 3,757,971 | 9/1973 | Frish | 414/127 |
| 3,858,732 | 1/1975 | Kemper | 414/127 |
| 3,869,048 | 3/1975 | Takahashi | 414/127 |
| 4,042,125 | 8/1977 | Falkinger et al. | 414/95 |
| 4,043,460 | 8/1977 | Steele | 414/95 |
| 4,094,425 | 6/1978 | Gabbrielli | 414/331 |

*Primary Examiner*—John J. Camby
*Attorney, Agent, or Firm*—Body, Vickers & Daniels

[57] ABSTRACT

Apparatus is disclosed for heating a plurality of sheets of plastic material between adjacent ones of a plurality of vertically stacked and individually heated platens. The platens are vertically displaceable together and relative to one another, and any two vertically adjacent platens are vertically separable relative to a fixed horizontal pass line to facilitate removing a heated plastic sheet from between the platens and introducing a plastic sheet to be heated therebetween. Vertical separation is achieved by latching the upper one of two adjacent platens in a fixed holding position above the pass line and lowering the lower one of the two platens and any other platens of the stack therebeneath to position the upper surface of the lowered platen at the pass line. Sheet discharge and feed mechanisms are then operable respectively to remove a heated sheet from the lower platen and introduce a sheet to be heated onto the lower platen. In a preferred mode of operation, plastic sheets to be heated are sequentially introduced between adjacent ones of the platens from the top of the stack to the bottom thereof and are thereafter removed from between the platens in the same sequence, the elapsed time between introduction and removal providing the required soak time for preparing the plastic sheets for a forming or shaping operation such as in a press.

35 Claims, 20 Drawing Figures

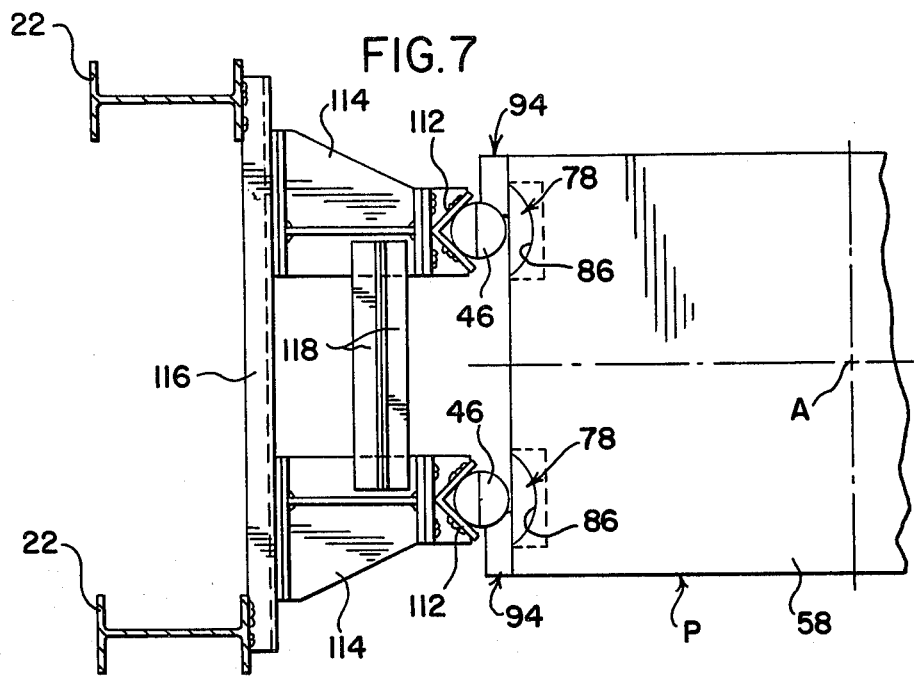
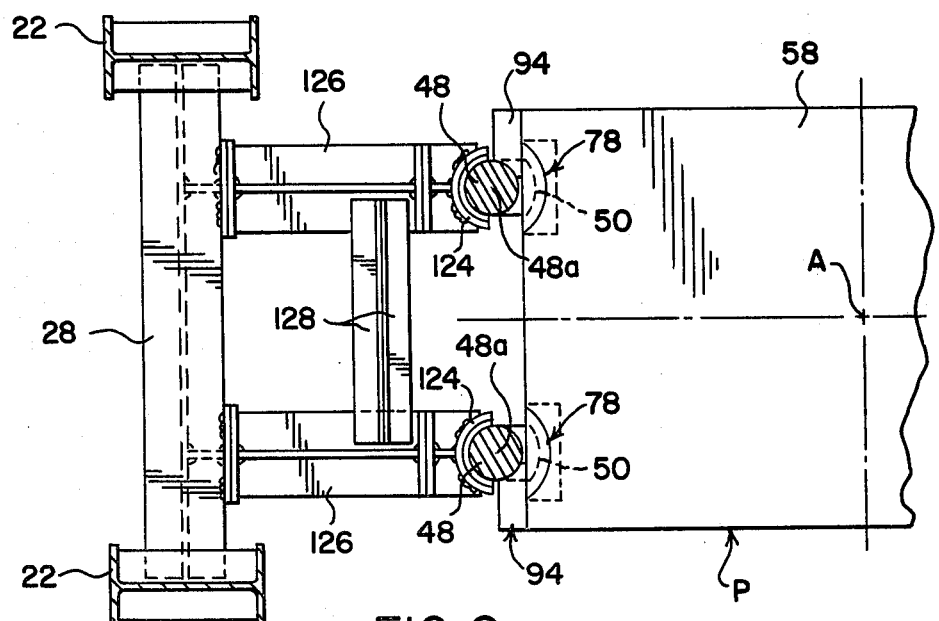

METHOD AND APPARATUS FOR HEATING PLASTIC SHEET MATERIAL

BACKGROUND OF THE INVENTION

This invention relates to the art of heating sheet material and, more particularly, to improved methods and apparatus for heating plastic sheet material.

In connection with the heating of plastic sheet material for processing, such as by forming the heated sheet in a press to form an article of manufacture, it is of course necessary to heat the plastic sheet over a predetermined soak time to elevate the sheet to the appropriate temperature for forming. In connection with a production line operation for forming articles of manufacture, such heating for a predetermined soak time has been achieved by progressively feeding sheet material along an elongate horizontal path through an oven and at a rate of travel providing for the sheet material to have the desired temperature and other forming characteristics upon reaching the exit end of the oven. The rate of the output of such an oven with respect to time is dependent on the length of the oven path whereby, in order to increase the production rate with respect to the article, an undesirably long oven path must be provided to facilitate a higher feed rate of the sheet material therethrough. Accordingly, an undesirable amount of floor space is required to accommodate the heating apparatus in order to obtain a suitable production rate. Further, while the feed rate of plastic material can be adjusted to provide the appropriate soak time for a given plastic material and/or the dimensions of the plastic sheets, there is no capability of selectively removing a sheet from within the oven prior to the soak time provided by feeding the sheet completely through the oven, or to increase the soak time for a given sheet other than by reintroducing the heated sheet following discharge from the oven thus doubling the soak time. Therefore, it is desired for example to experiment with the forming or other processing of heated plastic sheets of different plastic materials and/or sheet dimensions, it is necessary to heat such different sheets individually by movement thereof through the oven at a feed rate providing the desired experimental soak time, whereby such experimental use of the apparatus is both time consuming and expensive. While it might be possible to stop the feeding of sheets through such an oven to facilitate the removal of a given sheet prior to its reaching the exit end of the oven, this cannot be done without adversely affecting the heating of the other sheets within the oven.

SUMMARY OF THE INVENTION

In accordance with the present invention, improved methods and apparatus are provided for heating plastic sheet material in a manner which minimizes floor space requirements, enables optimizing the production rate with respect to the number of sheets being processed through the apparatus, and enables the sequential feeding, heating and discharging of a plurality of individual sheets of plastic material in a manner whereby such sequence is selective with respect to the plurality of sheets. Moreover, the methods and apparatus according to the present invention enable processing a given plastic sheet through the apparatus independent of and without affecting the processing taking place with respect to other sheets in the apparatus. Accordingly, the present invention advantageously enables sheets of a given plastic material and the same sheet dimensions to be sequentially and progressively introduced, heated and discharged for immediate processing such as in a forming press in a production line, thus optimizing a production rate with respect to an article of manufacture. Additionally, the present invention enables a plurality of sheets of the same or different plastic materials having the same and/or different dimensions to be selectively introduced, heated and discharged in a sequence determined by a predetermined desired soak time for the different sheets, thus enabling the non-progressive processing of sheets for experimental or other use following discharge from the apparatus.

More particularly in accordance with the present invention, the foregoing advantages are achieved by heating plastic sheets between vertically adjacent ones of a stack of individually heated horizontal platens which are adapted to be vertically displaced, selectively, relative to vertically spaced apart holding and pass line positions. In the latter positions, respectively, one platen is held against vertical displacement and the platen immediately therebeneath is spaced therebelow to facilitate removal of a heated plastic sheet from the top surface of the latter platen and the introduction of a sheet to be heated thereonto. During such relative displacements, the remaining platens in the stack, whether above the platen held against vertical displacement or below the platen lowered to the pass line, remain juxtaposed. Accordingly, the heating of the plastic sheets between adjacent ones of the latter platens is not affected by the discharge and feed operations which take place at the pass line. Following the feeding of a sheet to be heated onto the upper surface of the platen positioned at the pass line, the latter platen is elevated to and held in the hold position, whereby the newly introduced sheet is positioned between juxtaposed adjacent platens.

Latching mechanisms are operable to releaseably hold a given platen and any platens of the stack thereabove in the holding position during lowering of the platen immediately beneath the given platen to the pass line, and vertical displacement of the platens relative to the pass line and holding position is achieved by an elevating and lowering mechanism beneath the stack. The elevating and lowering mechanism has a vertical displacement capability enabling the upper one of any two vertically adjacent platens in the stack to be selectively displaced to the holding position, and the latching mechanisms and the elevating and lowering mechanism can be operated so as to achieve relative separation of any given pair of adjacent platens in the stack for removal of the heated plastic sheet from therebetween and introduction of a sheet to be heated onto the platen at the pass line. Such relative separation can be achieved in accordance with a predetermined sequence which may be progressive or non-progressive with respect to sequentially adjacent platens in a direction from one end of the stack toward the other.

It is accordingly a primary object of the present invention to provide improved methods and apparatus for heating plastic sheet material.

Another object is the provision of improved methods and apparatus for heating a plurality of sheets of plastic material in a manner which enables the continuous output of heated sheets with minimum floor space requirements for the heating apparatus.

Yet another object is the provision of improved methods and apparatus for heating a plurality of plastic sheets in a manner which enables the feeding, heating and discharging of each individual sheet to be achieved without affecting the processing of other sheets in the plurality.

A further object is the provision of improved apparatus for progressively heating a plurality of plastic sheets in corresponding heating chambers each adapted to be selectively accessed in accordance with the heating process for the plastic sheet therein and without affecting the heating process with respect to plastic sheets in the others of the chambers.

Still another object is the provision of apparatus of the foregoing character in which the individual heating chambers are defined by vertically juxtaposed horizontal platens in a stack, any selected pair of which platens are adapted to be vertically separated to provide access to the chamber defined thereby for the introduction and removal of plastic sheet material from the chamber while platens in the stack above and/or below the separated platens remain juxtaposed relative thereto and to one another, whereby the heating of plastic sheet material in the chambers other than the open chamber is not affected during such introduction and removal.

Still another object is the provision of improved apparatus selectively operable to achieve the feeding, heating and discharging of heated plastic sheets in a sequence which is selectively progressive or non-progressive with respect to successive sheets introduced into the apparatus for heating.

BRIEF DESCRIPTION OF THE DRAWINGS

The foregoing objects, and others, will in part be obvious and in part pointed out more fully hereinafter in connection with the written description of a preferred embodiment of the invention illustrated in the accompanying drawings in which:

FIG. 7 is a cross-section view taken along line 7—7 in FIG. 3 and showing the lateral support arrangement for the lower platen guide posts;

FIG. 8 is a cross-section view taken along line 8—8 in FIG. 3 showing the lateral support arrangement for the upper platen latch posts;

Referring now in greater detail to the drawings wherein the showings are for the purpose of illustrating a preferred embodiment of the invention only, and not for the purpose of limiting the invention, FIGS. 1-3 illustrate an oven 10 for heating plastic sheet material in accordance with the present invention. As will be described in greater detail hereinafter, oven 10 is comprised of a plurality of individually heated platens P disposed in a vertical stack and manipulatable for any two adjacent ones of the platens to be vertically separated for the upper surface of the lower one of the platens to be disposed at a horizontal pass line L and for the upper one of the two platens to be releaseably supported in a holding position H spaced above the pass line. Individual sheets of plastic material are heated between adjacent platens in the stack, and separation of adjacent ones of the platens in the foregoing manner facilitates removing a heated plastic sheet from the upper surface of the lower platen and introducing a sheet to be heated thereonto.

In accordance with one aspect of the invention, oven 10 can be used in connection with the continuous production of an article of manufacture from heated plastic sheet material. As illustrative of such use, FIG. 1 shows sheet feeding apparatus 12 adjacent input end 10a of the oven for introducing plastic sheet material to be heated thereinto, sheet discharge and transfer apparatus 14 adjacent discharge end 10b of the oven for removing heated sheet material therefrom, and a forming press 16 to which each heated sheet is transferred by apparatus 14 and which is operable to form the sheet to provide the article of manufacture.

Figure 1:
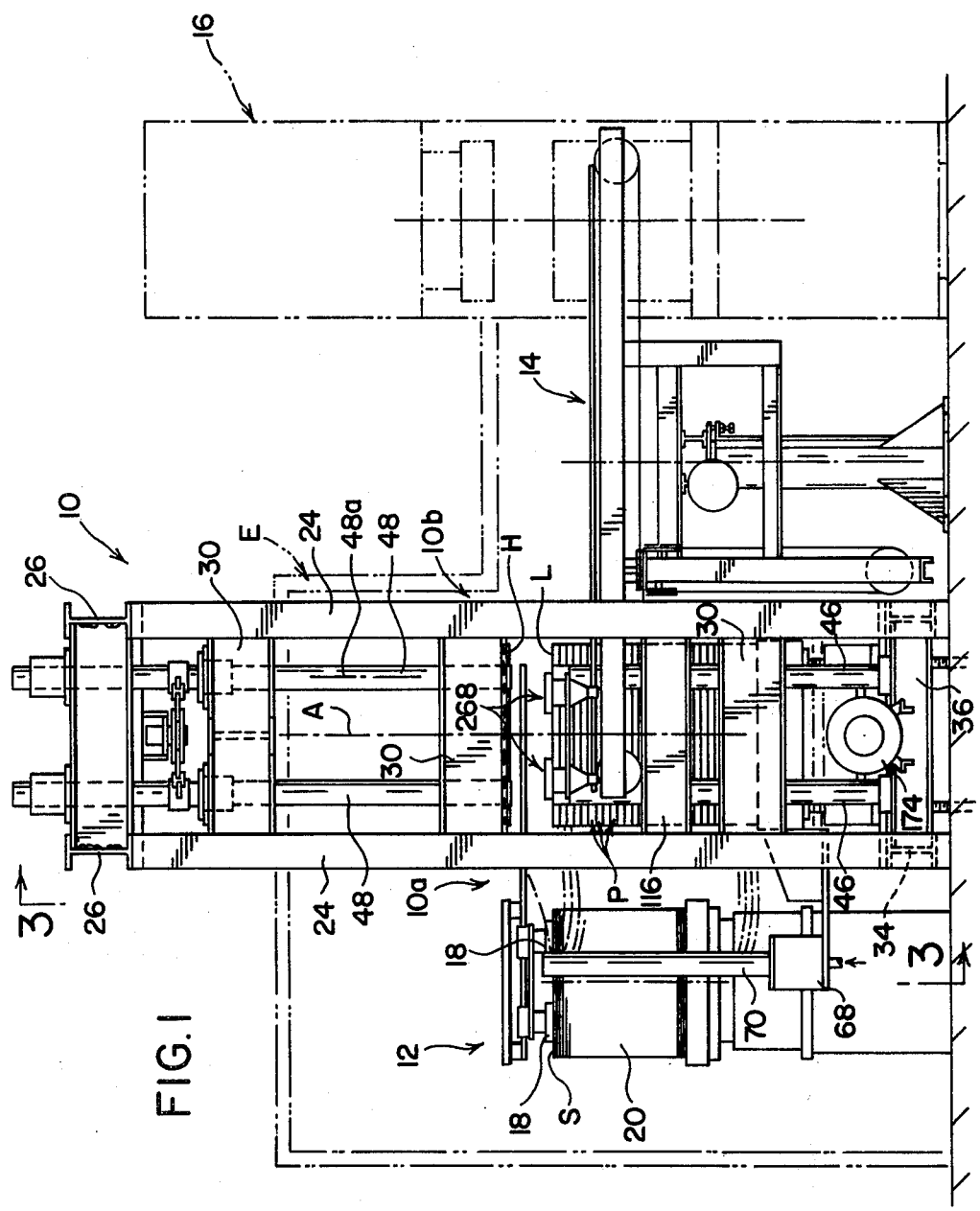
FIG. 1 is a side elevation view illustrating sheet feeding, heating and discharge apparatus according to the present invention in association with a press to which heated sheet material is transferred for forming.

As described in greater detail hereinafter, discharge and transfer apparatus 14 is operable when adjacent platens are vertically separated as described above to engage the side edges of the heated plastic sheet on the upper surface of the lower platen and to displace the sheet therefrom and to press 16. It will be appreciated that press 16 includes relatively displaceable die assemblies between which the heated sheet is positioned by discharge and transfer apparatus 14 and which die assemblies are cooperable to shape the sheet during an operating stroke of the press. Press 16 does not form a part of the present invention, whereby details regarding the structure and operation thereof are not necessary. It will also be appreciated that the processing of heated plastic sheets discharged from oven 10 by discharge and transfer apparatus 14 can be achieved by means other than such a forming press, if desired.

While the platens are separated, and following removal of a heated plastic sheet from the oven, sheet feeding apparatus 12 is operable to transfer a sheet of plastic to be heated onto the upper surface of the lower platen. While any suitable sheet feeding apparatus can be employed for this purposed, sheet feeding apparatus 12 in the embodiment disclosed is vacuum operated and is comprised of a plurality of vacuum head components 18 overlying a stack 20 of plastic sheets S adjacent the input end of oven 10. As is well known in connection with such vacuum feed apparatus, vacuum heads 18 are supported for vertical displacement to engage and elevate the uppermost sheet from the stack, and the heads are supported for longitudinal reciprocation to displace the elevated sheet along pass line L to the oven.

Figure 2:
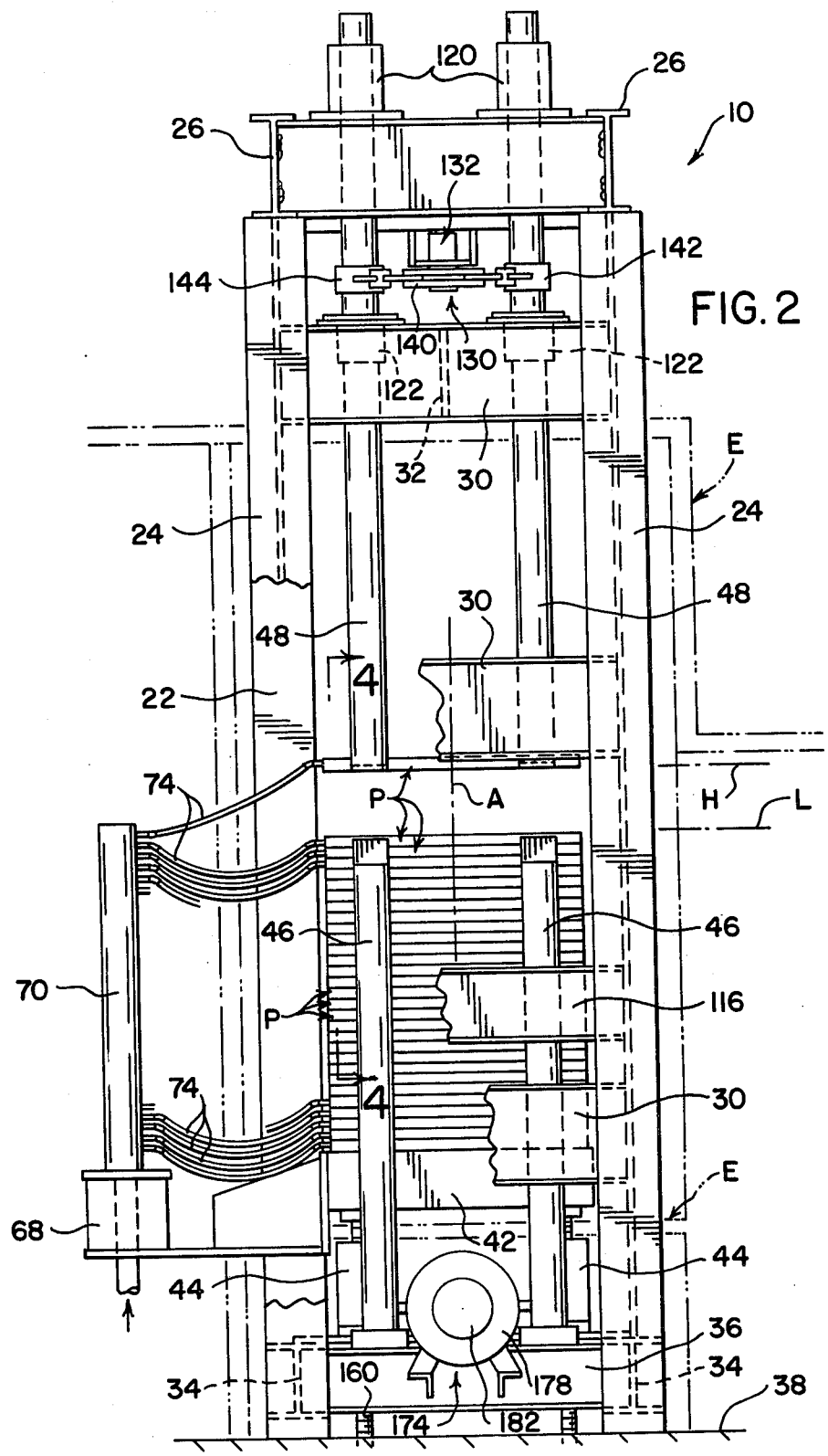
FIG. 2 is a side elevation view of the heating apparatus of FIG. 1.
Figure 3:
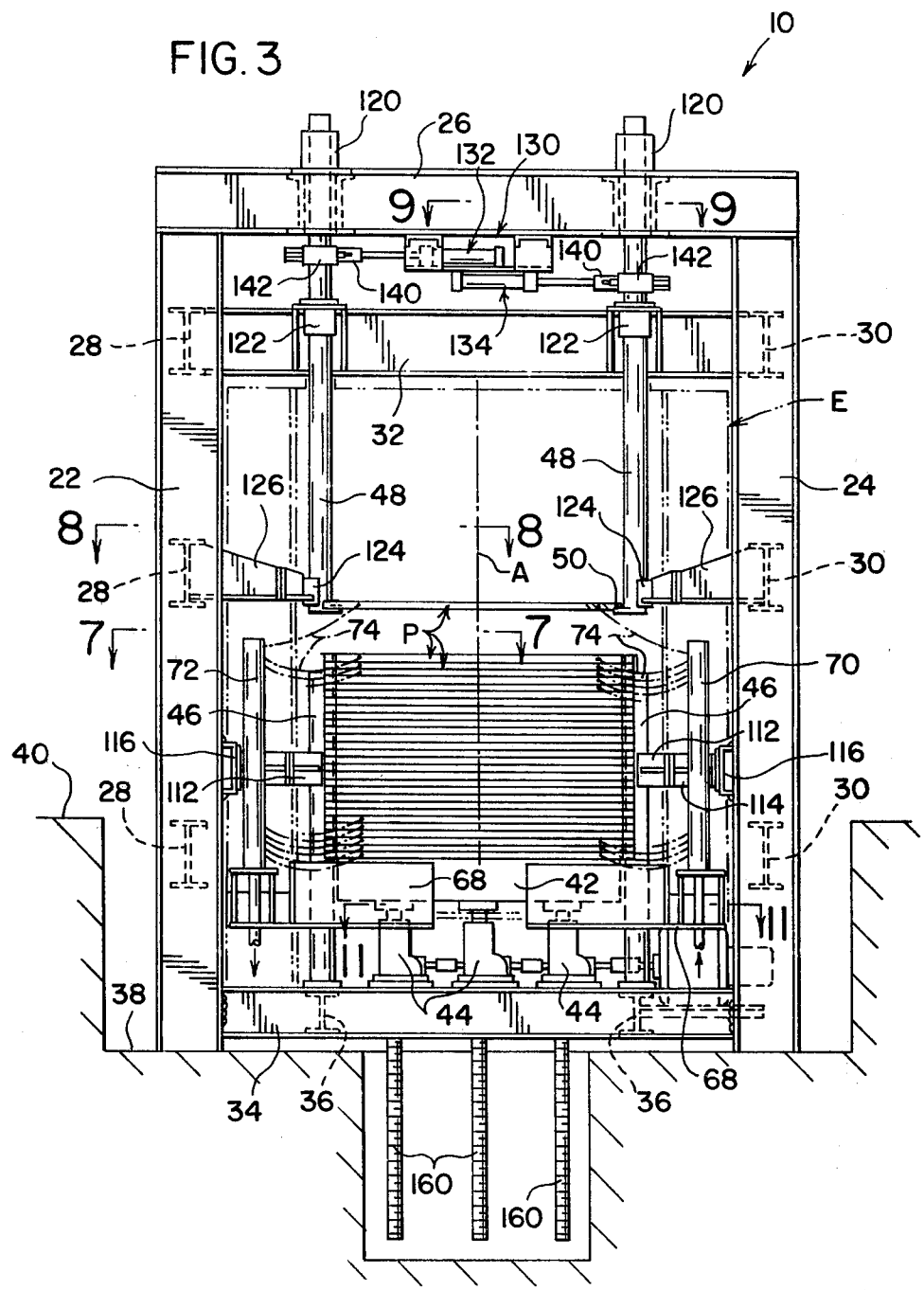
FIG. 3 is an end elevation view of the heating apparatus as seen along line 3—3 in FIG. 1.

As further seen in FIGS. 1-3 of the drawing, oven 10 includes a supporting frame structure comprised of upright beam members 22 and 24 in pairs on laterally opposite sides of the oven with respect to the direction of pass line L, the beams of each pair being longitudinally spaced apart with respect to the latter direction. Laterally extending upper cross beams 26 are disposed between corresponding ones of the beams 22 and 24, and longitudinally extending and vertically spaced apart beam members 28 and 30 are disposed between the pairs of beam members 22 and 24, respectively. The frame structure further includes a center beam member 32 extending between the upper ones of the beam members 28 and 30, laterally extending beam members 34 between the lower ends of corresponding ones of the upright beam members 22 and 24, and longitudinally extending beam members 36 between beam members 34. The various beam members of the frame structure are suitably interconnected with one another, such as by welding, and the lower ends of upright beam members 22 and 24 are supported on and suitably fastened to a foundation 38 below floor line 40. The frame structure supports a suitable enclosure E of insulating material which, for purposes of clarity, is only shown schematically. It will be appreciated that such an insulating enclosure is preferred so as to optimize heat retention in the oven area and to avoid exposing the open platens to drafts during feed and discharge operations. Such an enclosure can be provided for example by walls of fibrous insulating material.

Figure 4:
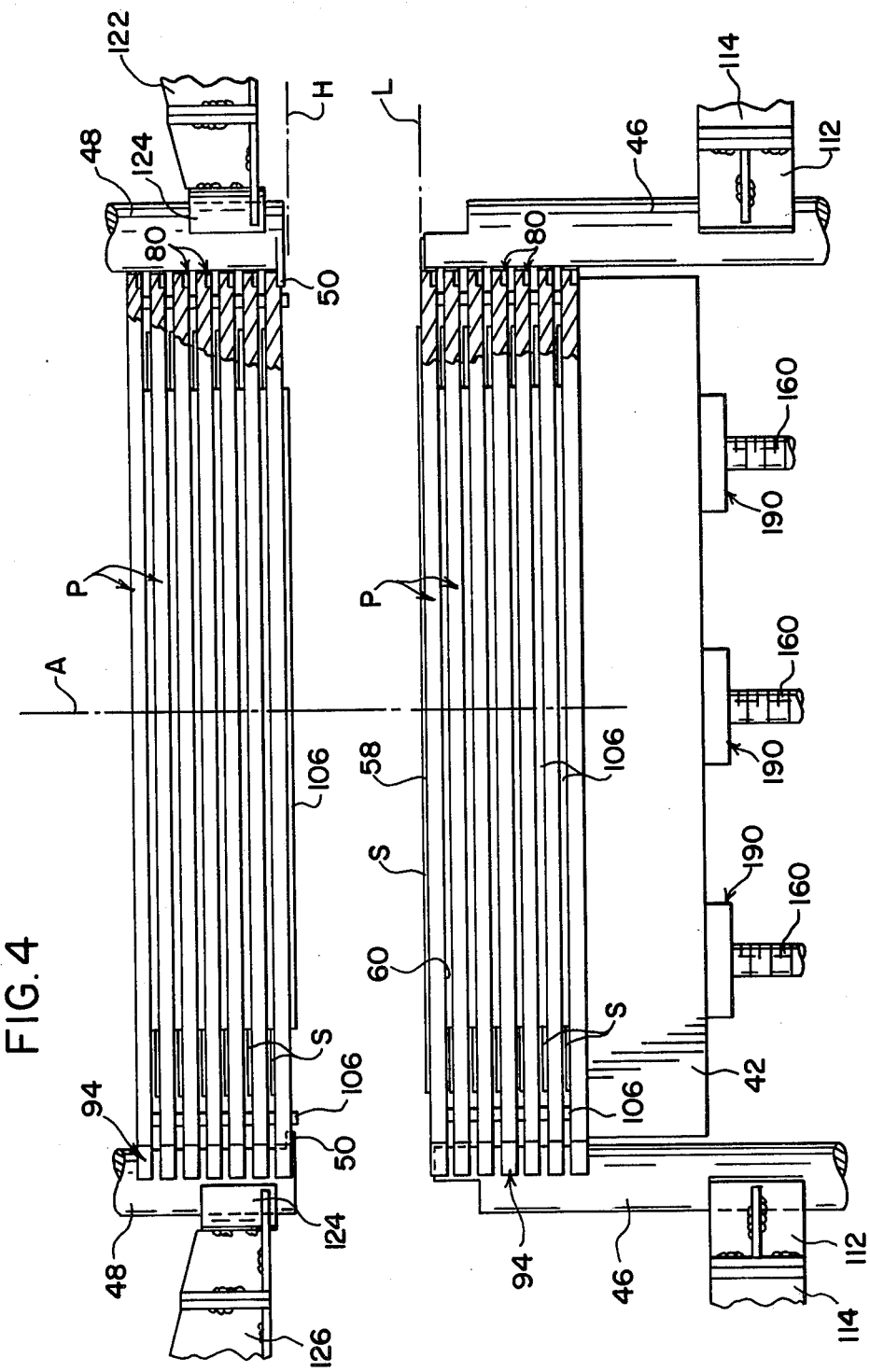
FIG. 4 is a sectional elevation view taken along line 4—4 in FIG. 2 and showing the platen, guide post and latch post relationship.

The stack of platens P is supported within the frame structure for linear vertical displacement along a path having an axis A by means of a platen support platform 42 underlying the lowermost one of the platens. Platform 42 is vertically displaceable by means of a plurality of screw jack mechanisms 44 disposed therebeneath, the structures and operation of which are described in detail hereinafter. Vertical and lateral guidance for platens P during displacement along axis A is provided below pass line L by means of pairs of vertically extending circular guide posts 46 extending upwardly adjacent the laterally opposite sides of platens P and having sliding interengagement therewith as will become apparent hereinafter. Vertical and lateral guidance for platens P and releasable support of the platens above holding position H is provided by means of pairs of vertically extending circular latch posts 48 on laterally opposite sides of the platens and each of which is coaxial with a corresponding one of the guide posts 46. Latch posts 48 are of the same diameter as guide posts 46, and each latch post has a lower end at holding position H which, as seen in FIGS. 3 and 4, is provided with a latch member 50 extending radially outwardly from a circumferential portion of the outer surface thereof. In the manner and for the purpose set forth more fully hereinafter, one of the platens P and any other platens of the stack thereabove are adapted to be releaseably held with the one platen at hold position H by interengagement of latch members 50 with corresponding recesses in the laterally opposite sides of the platens. To achieve releaseably interengagement, each of the latch posts is mounted on the frame assembly as described hereinafter for pivotal movement about its axis, which pivotal movement enables displacement of the corresponding latch member 50 between latched and unlatched positions relative to platens P.

Figure 5:
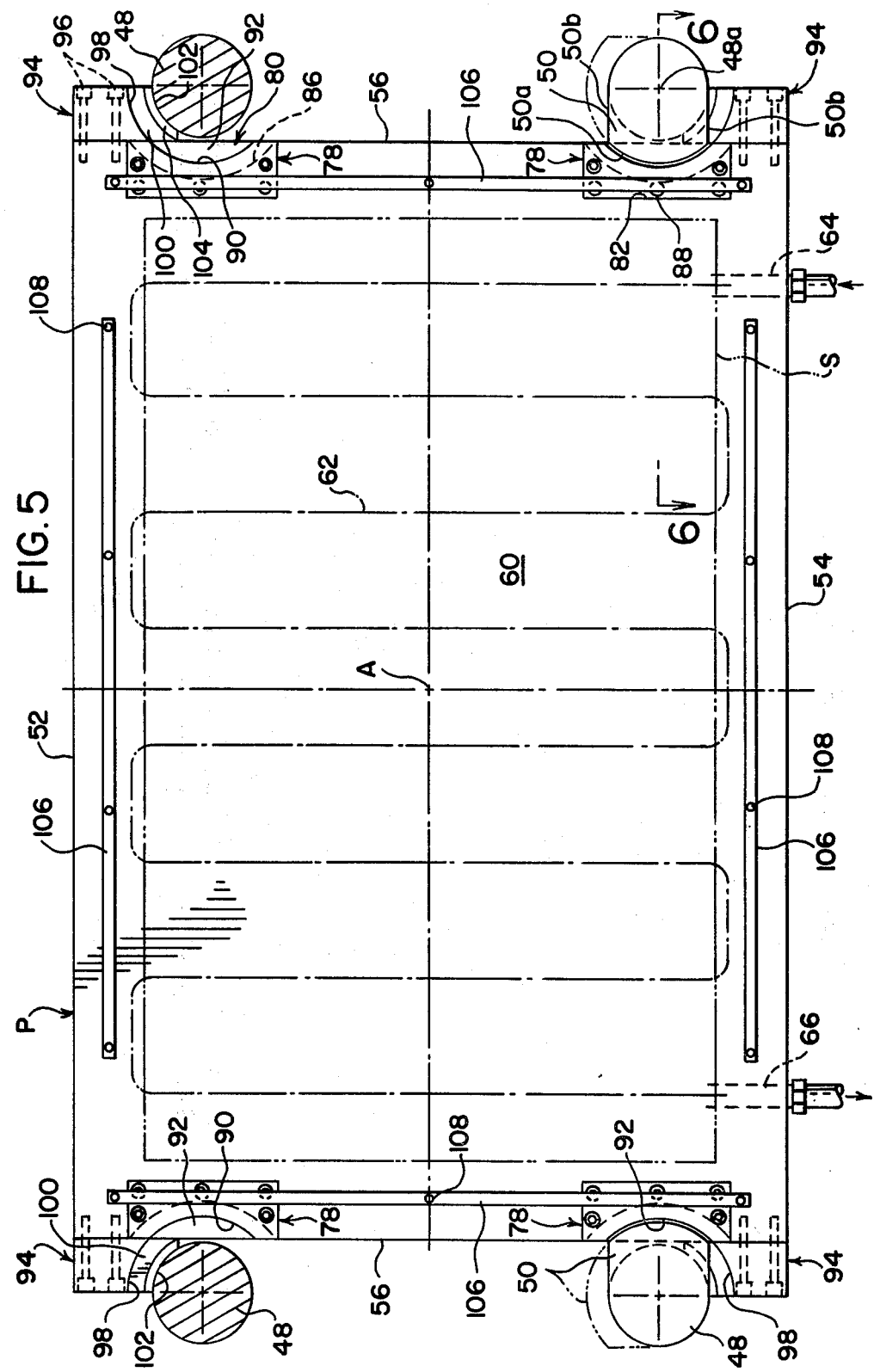
FIG. 5 is a plan view showing the platen structure and looking at the underside of the platen.
Figure 6:
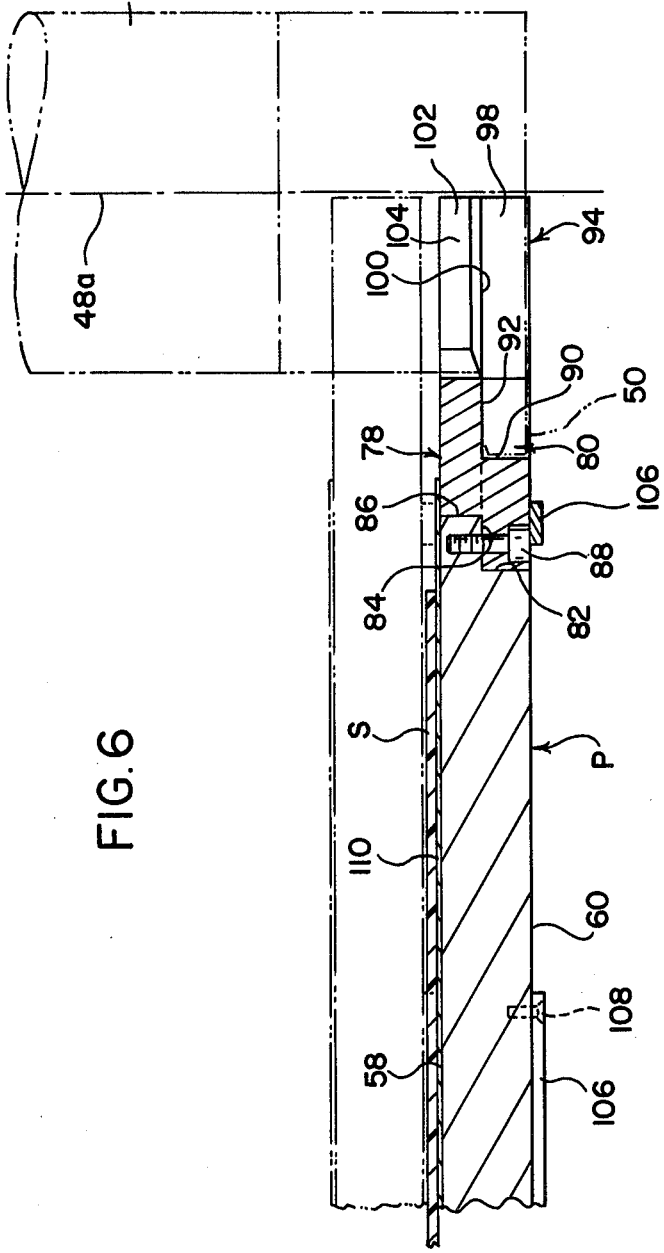
FIG. 6 is a cross-sectional view taken along line 6—6 in FIG. 5 and illustrating the platen guide and support structure.
Figure 9:
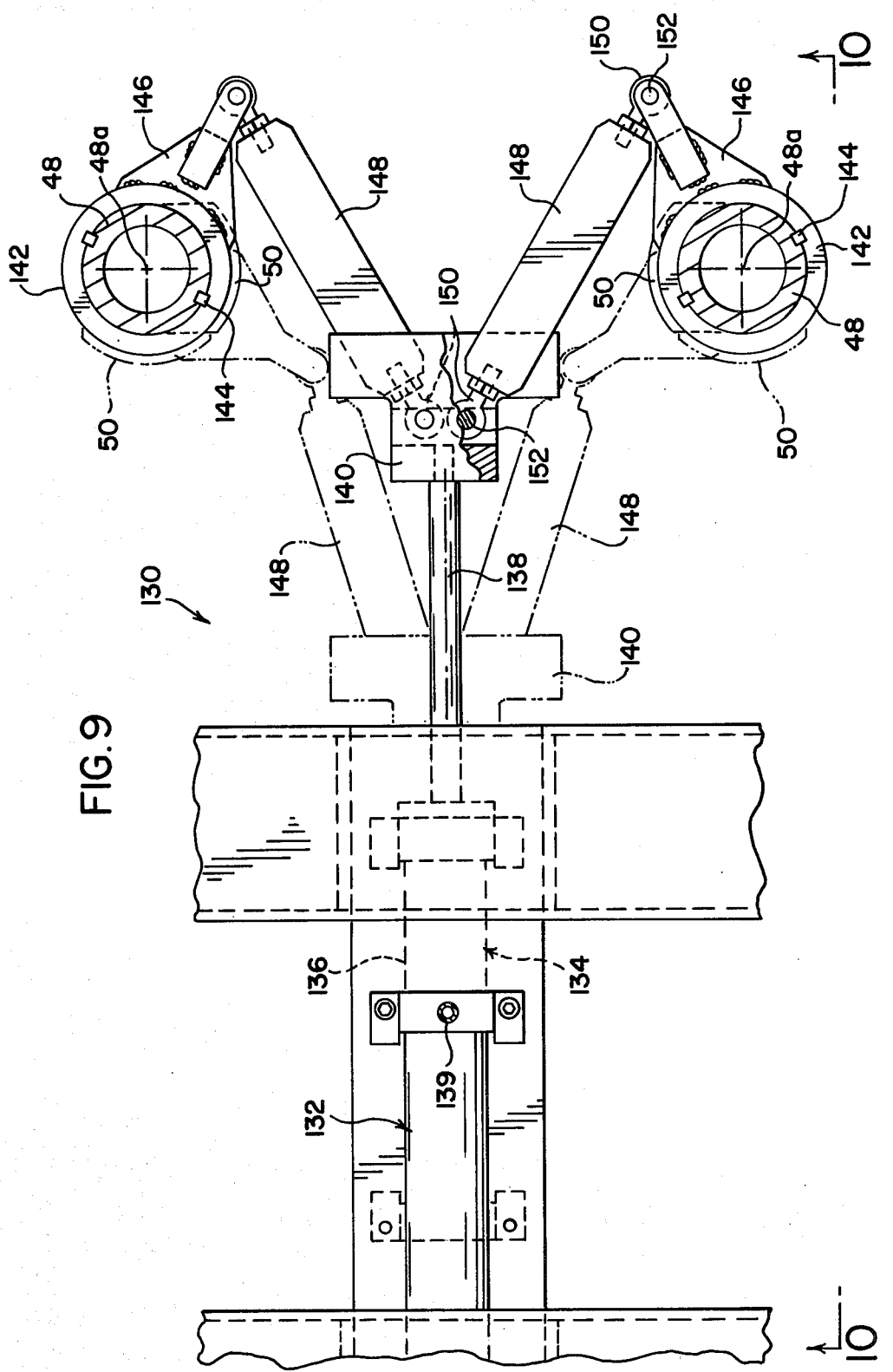
FIG. 9 is a plan view of the latch post actuator mechanism taken along line 9—9 in FIG. 3.
Figure 10:
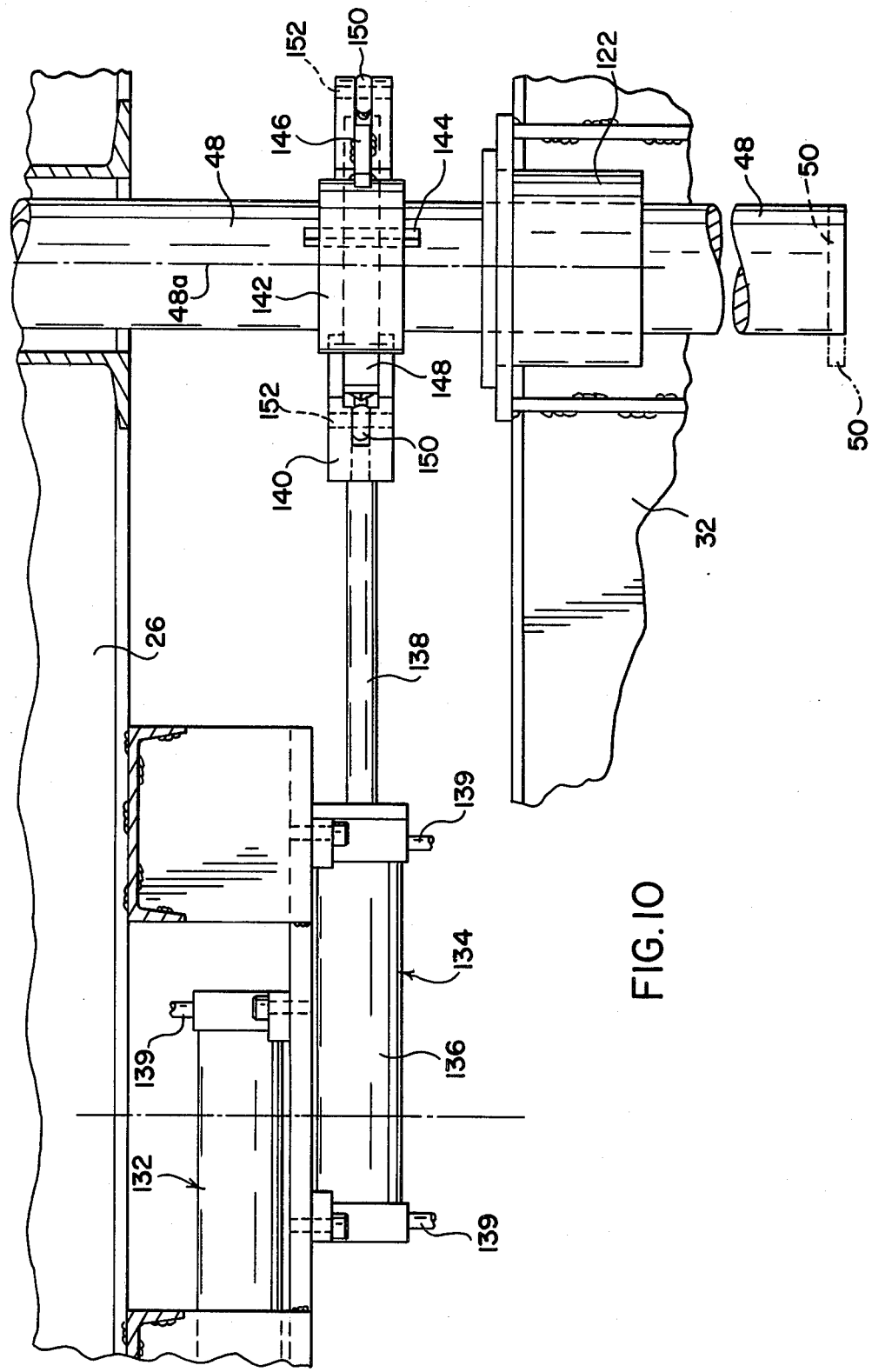
FIG. 10 is an elevation view of the latch post actuator mechanism taken along line 10—10 in FIG. 9.

The platen structure, including arrangements by which the foregoing guidance and platen support is achieved, is shown in FIGS. 4-6 of the drawing. Each of the platens is of the same construction, whereby it will be appreciated that the description with reference to the platen shown in detail in FIGS. 5 and 6 is applicable to the others. Each platen P is rectangular in contour and has front and rear edges 52 and 54 adjacent the discharge and input ends of the oven, respectively. Each platen further includes laterally opposite side edges 56, and planar top and bottom surfaces 58 and 60, respectively, the latter of which is visible in the plan view of FIG. 5. Each of the platens is individually heated such as by the flow of hot oil therethrough and, for this purpose, each platen is provided with an undulated fluid flow passageway 62 therethrough having an entrance end 64 at rear edge 54 adjacent one of the side edges, and an exit end 66 at the rear edge and adjacent the other of the side edges. As will be appreciated with reference briefly to FIGS. 1-3 of the drawing, platen support platform 42 is provided adjacent the laterally opposite sides thereof and adjacent the end thereof corresponding to rear edges 54 of platens P with support brackets 68 which are displaceable therewith and which carry inlet and outlet manifolds 70 and 72, respectively. Inlet manifold 70 is provided with a plurality of outlet ports corresponding in number to the number of platens P and each of which is connected by means of a flexible hose 74 to inlet end 64 of passageway 62 in a corresponding one of the platens. Similarly, outlet manifold 72 is provided with a plurality of inlet ports each connected by a flexible hose to the outlet end 66 of passageway 62 in a corresponding one of the platens. The inlet and outlet manifolds are connected to a source of heated oil, not shown, which is adapted to be circulated from the source to the inlet manifold, thence through the individual platens to the outlet manifold and back to the source.

Referring again to FIGS. 4-6, the bottom surface 60 of each platen is provided along each of the side edges 56 and adjacent the front and rear edges of the platen with a recess receiving a bronze platen support insert 78 which includes a latch member receiving recess 80 in the underside thereof. As will be appreciated from FIG. 4, recesses 80 on the laterally opposite sides of platens P provide a bearing surface which is disposed in overlying engagement with the upper surface of latch member 50 of the corresponding latch post component when the latching member is in the latched position with respect to the platen in holding position H. The recess in platen P for insert 78 includes a linear inner wall 82 having a depth of about one-half the thickness of the platen, a horizontal wall 84 extending from wall 82 toward platen edge 56, and an arcuate wall 86 intersecting wall 84 and top surface 58 of the platen. Insert 78 is similarly contoured to seat in the recess in the platen, the opposite sides of the insert are coplanar with the opposite sides of the platen, and the insert is secured to the platen by means of a plurality of set screws 88.

Latch member receiving recess 80 in insert 78 is defined by an arcuate wall 90 extending thereinto a distance equal to about one-half the platen thickness, and an outwardly extending horizontal surface 92 which provides the bearing surface for engagement with latch member 50. As is shown in FIG. 5, latch member 50 has an arcuate outer surface 50a coaxial with latch post axis 48a and radially spaced outwardly from the circular outer surface of the latch post, and opposite side edges 50b extending from the opposite ends of edge 50a and tangentially with respect to the circular outer surface of the post. Side edge 56 of the platen is spaced from latch post axis 48a a distance closely corresponding to the radius of the circular outer surface of the latch post. Further, the curvature of wall 90 of recess 80 in insert 78 and the radial spacing of wall 90 from the latch post axis closely correspond to the radius of curvature and the extent of radial projection of edge 50a of latch member 50 relative to the latch post axis. The vertical depth of recess 80 as measured along wall 90 is no less than the axial thickness of latch member 50. Accordingly, it will be appreciated that when the latch members are in the latched positions thereof as shown in FIGS. 4–6, bearing surfaces 92 of recesses 80 engage the upper surfaces of the latch members to provide a four point support of platen P in the holding position H. It will be further appreciated that the closely adjacent relationship between latch posts 48 and side edges 56 of the platens provides vertical guidance for the platens and support against displacement thereof laterally relative to axis A, and it will be further appreciated that such guidance and support is provided for platens P by guide posts 46 below pass line L as a result of the coaxial relationship and like diameters of the guide posts and latch posts.

Vertical guidance and support of the platens against longitudinal displacement is provided by means of a laterally outwardly extending bronze guide component 94 associated with each of the inserts 78 and mounted on side edges 56 of the platens such as by means of bolts 96. Each guide component 94 has top and bottom surfaces coplanar with the corresponding surfaces of the platen and includes a recess in the bottom side thereof having an arcuate wall 98 and a horizontal bearing surface 100. Wall 98 is of the same radius as arcuate wall 90 in insert 78, bearing surface 100 is coplanar with bearing surface 92 of insert 78. Each guide component 94 further includes an arcuate guide surface 102 radially facing axis 48a of the corresponding latch post and having a radius of curvature corresponding to that of the circular outer surface of the latch post. Accordingly, it will be appreciated that the guide surfaces 102 of the two guide components on each side of the platen are adapted to slidably engage the corresponding latch posts for the platen to be vertically guided and supported against longitudinal displacement relative to axis A during displacement of the platen vertically relative to the latch post. It will likewise be appreciated that such guidance and support is provided by sliding inter-engagement between guide components 94 and guide posts 46 when the platens are disposed below pass line L. Preferably, a beveled surface 104 is provided between surfaces 100 and 102 of guide components 94 to facilitate pivotal displacement of latch member 50 relative to the guide component without interference therebetween.

As will be further seen from FIGS. 4–6, the underside of each platen is provided with gauge or spacer strips 106 along the front, rear and side edges of the platen and removably secured thereto such as by threaded fasteners 108. Strips 106 have a thickness relative to bottom surface 60 of the platen equal to or greater than the thickness of the plastic sheet material to be heated, and the strips serve to maintain juxtaposed adjacent platens in the stack spaced apart sufficiently to prevent compression of the plastic sheet during heating thereof. Further, the top surface 58 of each platen is preferably polished and provided with a coating 110 of a suitable mold release material which resists adherence of the plastic sheet to the platens surface during the heating process, thus to facilitate removal of the sheet from the platen. Such mold release materials are well known and include, for example, such components as waxes, silicones, fluoroplastics, and many proprietary blends of chemicals.

With further regard to the guidance of platens P by guide posts 46 when the platens are below pass line L, it will be appreciated from FIGS. 2–4 and 7 that the lower ends of guide posts 46 on laterally opposite sides of the platens overlie the corresponding one of the oven frame beam members 36 and are rigidly interconnected with the lower frame beam members such as by bolting or welding. The upper ends of guide posts 46 terminate at pass line L and, as shown in FIG. 7 with respect to the guide posts adjacent upright frame beam members 22, the guide posts are supported against lateral deflection relative to their axes by means of a corresponding V-shaped bearing block 112 supported relative to the frame structure by means of a mounting bracket assembly. More particularly, the mounting bracket assembly for each pair of guide posts includes bracket arm components 114 for each bearing block and to which the latter is bolted or otherwise suitably fastened, and a common mounting member 116 to which bracket arms 114 are attached and which extends between and is welded to the upright frame beams. Preferably, the bracket arms are interconnected by brace members 118 to rigidify the support of the guide posts against deflection.

As will be seen from FIGS. 2–4 and 8 of the drawing, each latch post 48 is supported for pivotal movement relative to its axis 48a by means of a corresponding threaded sleeve or nut 120 which rotates with the latch post 48 and is supported between upper frame beam members 26. The threaded sleeve 120 permits vertical adjustment of the latch post 48, thereby allowing the clearance between the separated platens to be adjusted. Each latch post is further supported and positioned by a bearing sleeve 122 supported from center beam 32. Further, as shown in FIG. 8 with respect to latch posts 48 adjacent upright frame beam members 22, the lower ends of the pair of latch posts on the laterally opposite sides of platens P are supported against lateral deflection relative to their axes by means of a corresponding semi-circular bearing block 124. Each bearing block is bolted or otherwise secured to a corresponding support arm 126 which is attached to and extends laterally inwardly from the vertically intermediate one of the frame beams 28. Preferably, support arms 126 are longitudinally interconnected by means of brace members 128 to rigidify support of the bearing blocks and thus the latch posts against lateral deflection of the posts relative to their axes in the direction between the input and output sides of the oven.

As best seen in FIGS. 2, 3, 9 and 10 of the drawing, pivotal displacement of latch posts 48 about their respective axes to displace the corresponding latch members 50 between latched and unlatched positions is achieved by a latch post actuating mechanism 130 supported on frame beam members 26 and operable to simultaneously pivot the latch posts about their axes. More particularly, actuating mechanism 130 includes upper and lower hydraulic piston and cylinder units 132 and 134 interconnected with one another and mounted as a unit between the undersides of frame beam members 26 by means of support members therebetween, not designated numerically. Upper unit 132 is operable to simultaneously pivot the latch posts adjacent frame beam members 22, and lower unit 134 is operable to simultaneously pivot the latch posts adjacent frame beam members 24. With the latter in mind, it will be appreciated that the following description of the mechanism illustrated in FIGS. 9 and 10 which is operable to pivot the latch posts adjacent frame members 24 is the same as that by which piston and cylinder unit 132 operates to pivot the other two latch posts. Referring now to the latter Figures, piston and cylinder unit 134 includes a cylinder 136 and a piston rod 138. Cylinder 136 slidably supports a piston, not illustrated, and piston rod 138 extends from the cylinder and has its inner end attached to the piston for displacement therewith. Cylinder 136 is provided with fluid inlet and outlet passageways 139 opening thereinto on opposite sides of the piston, and it will be appreciated that passageways 139 are connected to a suitable source of hydraulic fluid under pressure and through suitable controls, not illustrated, to facilitate control of fluid flow thereto to achieve reciprocation of the piston and thus piston rods 138. The outer end of piston rod 138 is provided with a yoke member 140, and each of the latch posts 48 is provided with an actuating collar 142 mounted thereon against rotation relative thereto such as by keys 144. Collar 142 includes a radially outwardly extending actuating arm 146 pivotally interconnected with yoke member 140 by means of a corresponding axially adjustable link member 148. More particularly in this respect, the axially opposite ends of link members 148 are provided with spherical rod-end bearings 150 providing for axial adjustment of the length thereof and providing for pivotal interconnection with yoke 140 and the corresponding actuator arm 146 by means of pivot pins 152. Accordingly, it will be appreciated that displacement of piston rod 138 in axially opposite directions relative to cylinder 136 imparts pivotal movement to latch posts 48 simultaneously and in opposite directions relative to one another. More particularly in this respect, displacement of the component parts between the solid line and broken line positions shown in FIG. 9 respectively positions latch members 50 of the pair of latch posts in the unlatched positions in which the latch members extend toward one another and the latched positions in which the latch members extend laterally inwardly relative to platens P and into latch receiving recesses 80 thereof described hereinabove.

Figure 11:
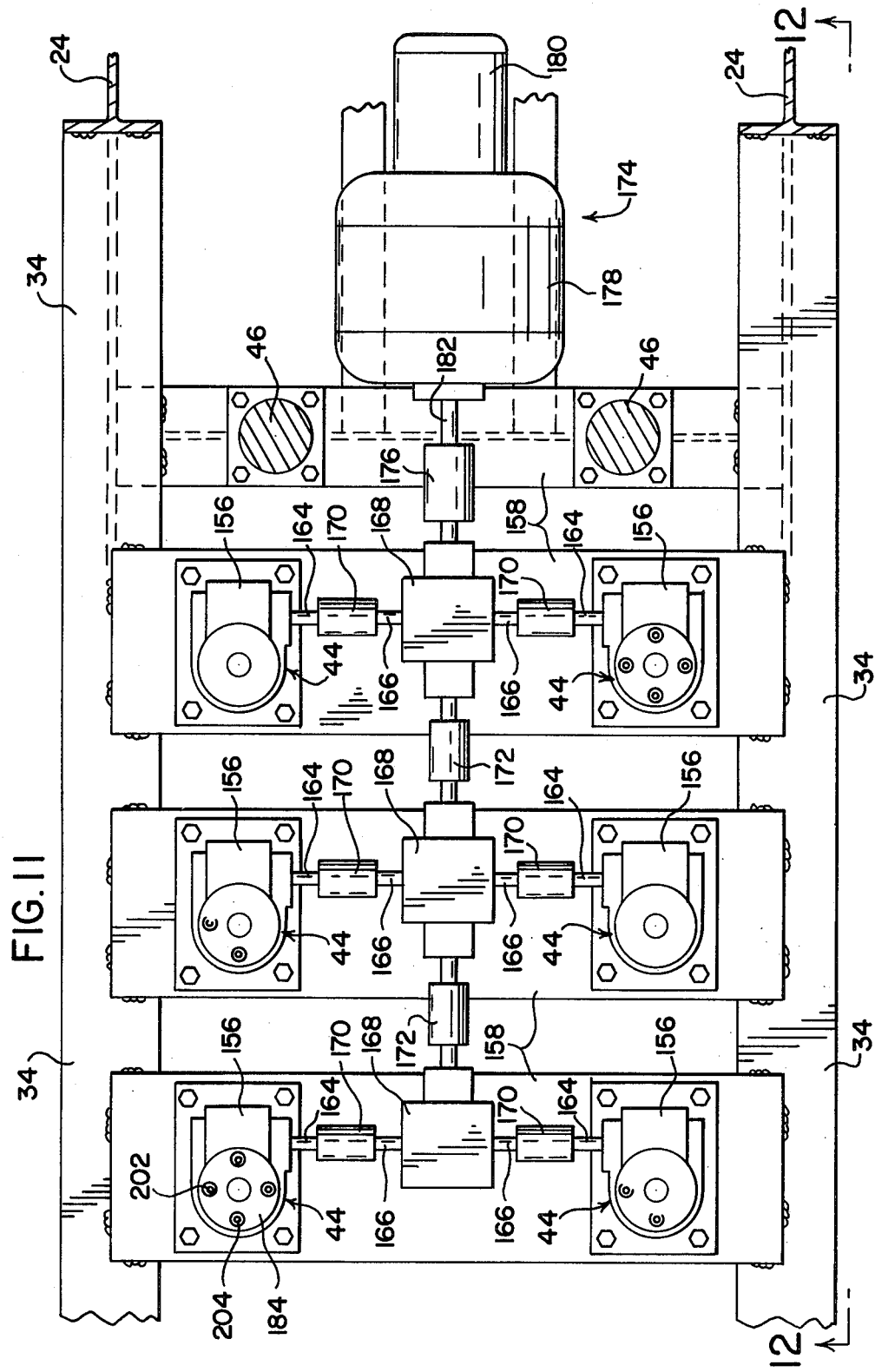
FIG. 11 is a plan view taken along line 11—11 in FIG. 3 and showing the jack arrangement for elevating and lowering the platen.
Figure 12:
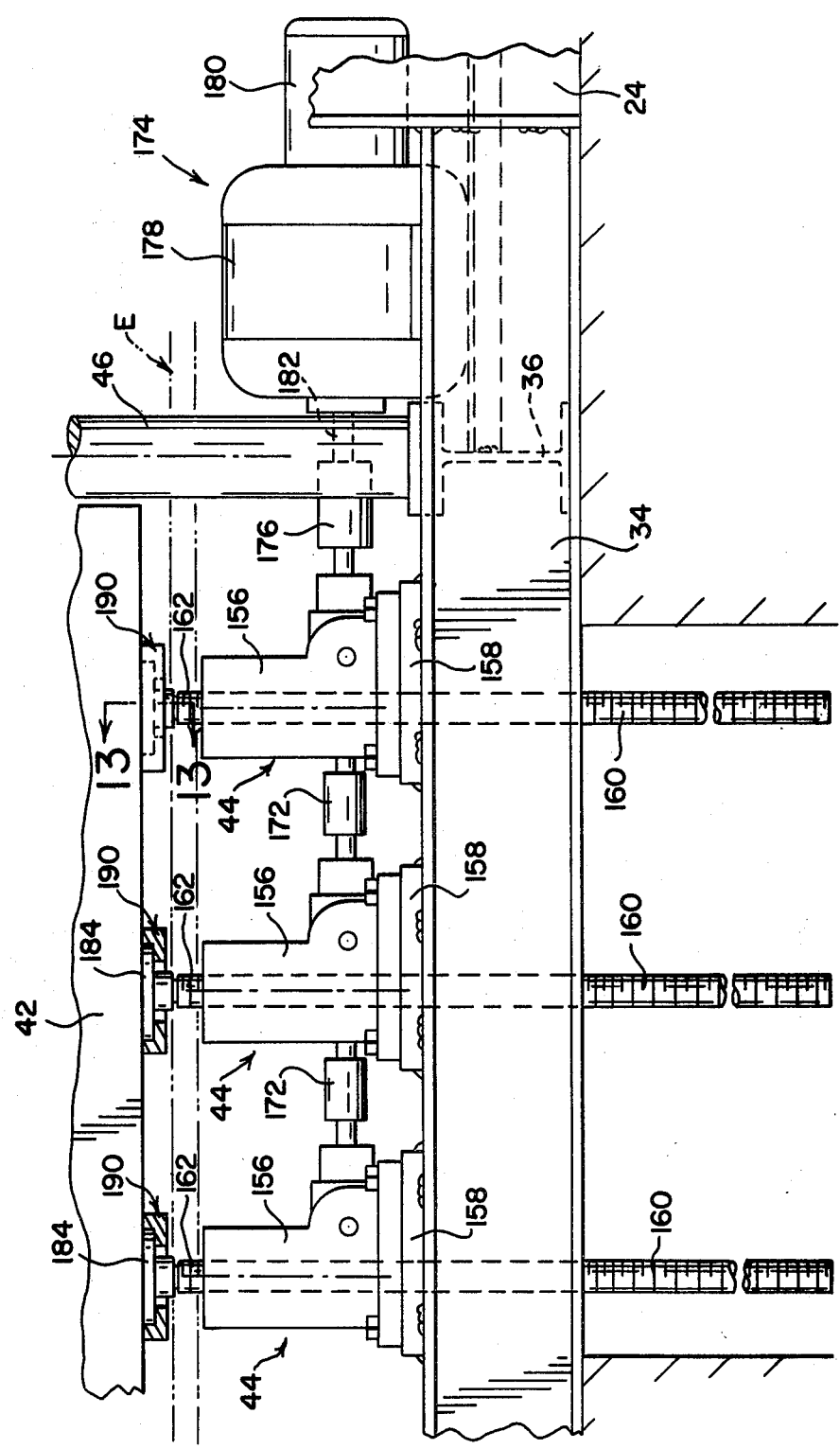
FIG. 12 is a side elevation view of the jack arrangement as seen along line 12—12 in FIG. 11.

FIGS. 11 and 12 of the drawing illustrate the structure and structural interrelationship between jack assemblies 44 mentioned hereinabove by which platen platform 42 and thus platens P are elevated and lowered relative to pass line L and holding position H. With reference to the latter Figures, six jacket assemblies 44 are positioned in laterally spaced apart and longitudinally aligned pairs with respect to the direction between the input and discharge sides of the oven. Each of the jack units includes a housing 156, and the jack units are supported on lower frame beam members 34 by means of support plates 158 extending therebetween and welded thereto and on which the jack housings are mounted by means of bolts not designated numerically. Each of the jack units 44 is of the ballscrew type which, as is well known in the art, include a non-rotating extendable and retractable ballscrew 160 extending through housing 156 and having an upper end 162 for connection to platform 42, and a rotatable ball nut, not shown, which surrounds ballscrew 160 in housing 156 is supported within the housing for rotation relative to the ballscrew and against axial displacement relative thereto. As is further well known, the ball nut is adapted to be rotated in opposite directions by means of a worm gear drive between the jack input shaft 164 and the ball nut. Thus, rotation of input shaft 164 in opposite directions about its axis imparts rotation of the ball nut in corresponding opposite directions relative to ballscrew 160 causing the ballscrew to be non-rotatably displaced upwardly or downwardly relative to housing 156 depending on the direction of rotation of the ball nut.

In the embodiment disclosed, the six jack units 44 are structurally interrelated to be driven in synchronism to achieve elevating and lowering of platen platform 42. In this respect, input shafts 164 of each longitudinally aligned pair of jack units 44 are adapted to be driven by output shafts 166 of a corresponding gear box 168 therebetween by means of couplings 170 between shafts 164 and 166. The three gear boxes 168 are drivingly interengaged by means of couplings 172 therebetween, and the gear boxes and thus jack units 44 are driven by a dual drive motor unit 174. Motor unit 174 is supported between frame beams 34 adjacent one of the laterally outer pair of jack units 44 and is drivingly interconnected with the gear box 168 therebetween by means of a coupling 176. Drive unit 174 includes coaxial motors 178 and 180 having a common output shaft 182 adapted to be driven at a first speed by motor 178 and at a second slower speed by motor 180. The purpose of such dual speed drive will be discussed in greater detail hereinafter. In any event, it will be appreciated that rotation of drive motor shaft 182 in one direction results in the simultaneous rotation of the screw nuts in the six jack units in the direction to achieve extension or elevation of ballscrews 160 and thus platen platform 42, and that rotation of drive shaft 182 in the opposite direction similarly provides for lowering or retraction of the six ballscrews and thus the platen platform.

It will be appreciated from FIGS. 2 and 12 that the upper ends 162 of ballscrews 160 and the platen platform 42 directly thereabove are exposed to the oven environment, whereas the jack housings 156 supported at the base of the frame assembly are insulated by a portion of enclosure E from the oven environment. This provides for a considerable temperature differential between the upper ends of the ballscrews and the jack housing support during use of the apparatus. Furthermore, platen platform 42 will laterally and longitudinally expand considerably in response to elevation of the temperature in the oven from room temperature at start up to its operating temperature whereas the support structure for the jack housings, in being insulated from the oven environment, will not expand appreciably.

Figure 13:
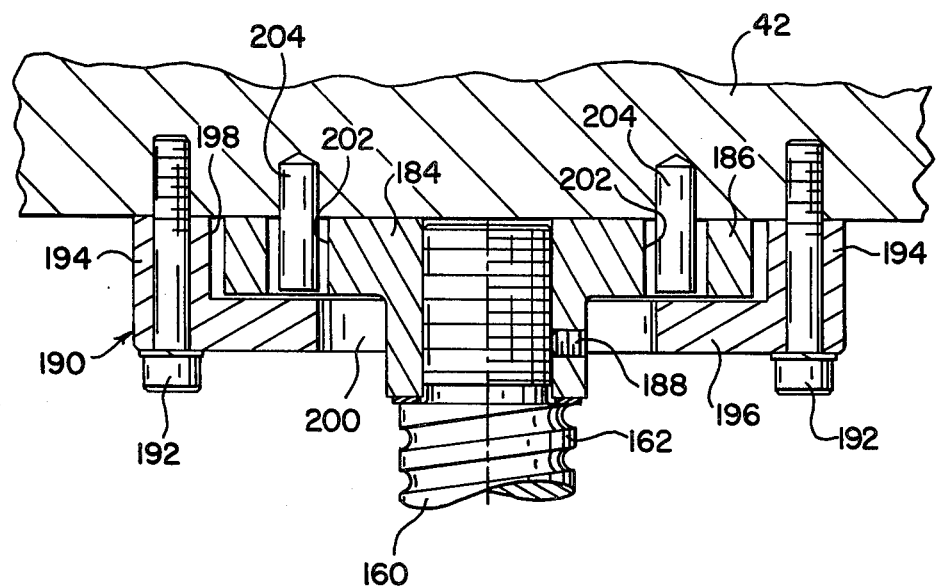
FIG. 13 is a cross-sectional elevation view taken along line 13—13 in FIG. 12 and showing the jack post attachment to the platen support bed.

In order to compensate for such relative expansion, it is preferred to provide a connection between the upper ends 162 of the ballscrews and the platen platform 42 which will allow expansion of the latter without a corresponding lateral or longitudinal deflection of the ballscrews relative to the jack housings, which deflections could impose undesirable binding loads on the jack units during elevating and lowering of the platform. Such a compensating connection for this purpose is illustrated in FIG. 13 of the drawing. In this respect, a jack mounting plate 184 is threadedly interengaged with the upper end 162 of the ballscrew and includes a radially extending circumferential flange 186 having an upper side facially engaging the underside of platen platform 42. Such a threaded interengagement is standard practice and facilitates adjusting the position of the mounting plate axially relative to the ballscrew to accurately achieve the desired ballscrew height relative to the jack unit support structure. A set screw 188 restrains rotation of the mounting plate relative to the ballscrew when the desired height adjustment has been achieved. In order to permit relative lateral displacement between mounting plate 184 and platen platform 42 in response to heating and expansion of the latter, a retaining component 190 is mounted on the underside of platform 42 by means of bolts 192. Retaining component 190 includes a circumferentially extending wall portion 194 and a radially inwardly extending flange portion 196, the latter having an inner surface spaced below the lower surface of mounting plate flange 186 to provide clearance against interengagement therebetween. Further, inner surface 198 of wall portion 194 is radially spaced from the outer surface of flange 186 of the mounting plate to provide sufficient clearance for lateral displacement of platen platform 42 relative to mounting plate 184, and flange 196 of the retaining component terminates in an opening 200 sufficiently spaced radially outwardly from the hub portion of mounting plate 184 to facilitate such relative displacement. Preferably, flange portion 186 of the mounting plate is provided with oversized openings 202 therethrough which receive corresponding dowel pins 204 mounted in the underside of platform 42. Dowel pins 204 advantageously assure against undesirable relative rotation of mounting plate 184 relative to the ballscrew should set screw 188 become ineffective for this purpose, and oversized openings 202 provide sufficient clearance with respect to pins 204 to enable the desired relative displacement between mounting plate 184 and platform 42. In order to enhance such relative displacement, the upper surface of mounting plate 184 and the underside of platform 42 are preferably finely finished and coated with high temperature grease.

Figure 14:
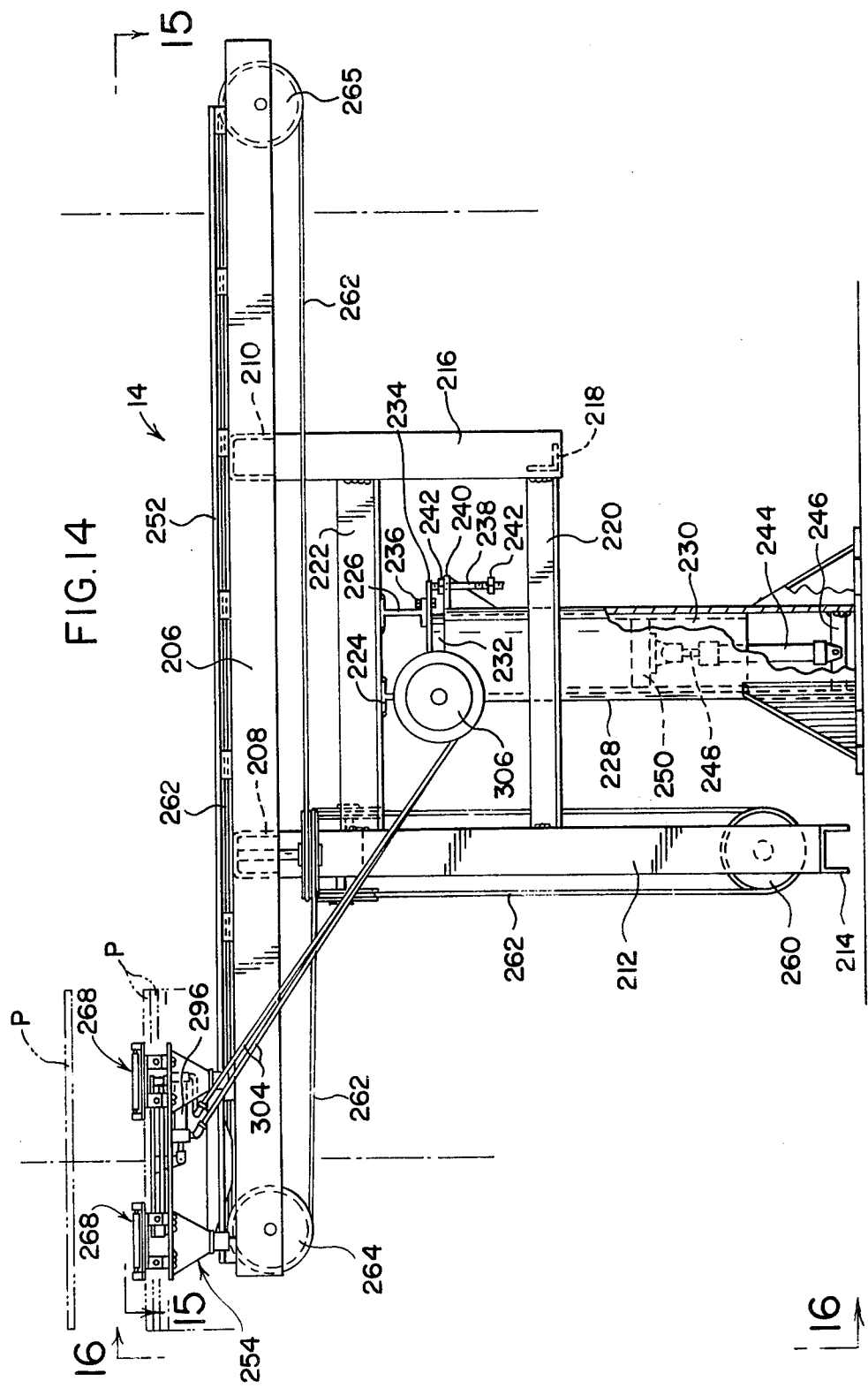
FIG. 14 is a side elevation view of the sheet discharge mechanism for removing heated sheet material from the oven.
Figure 15:
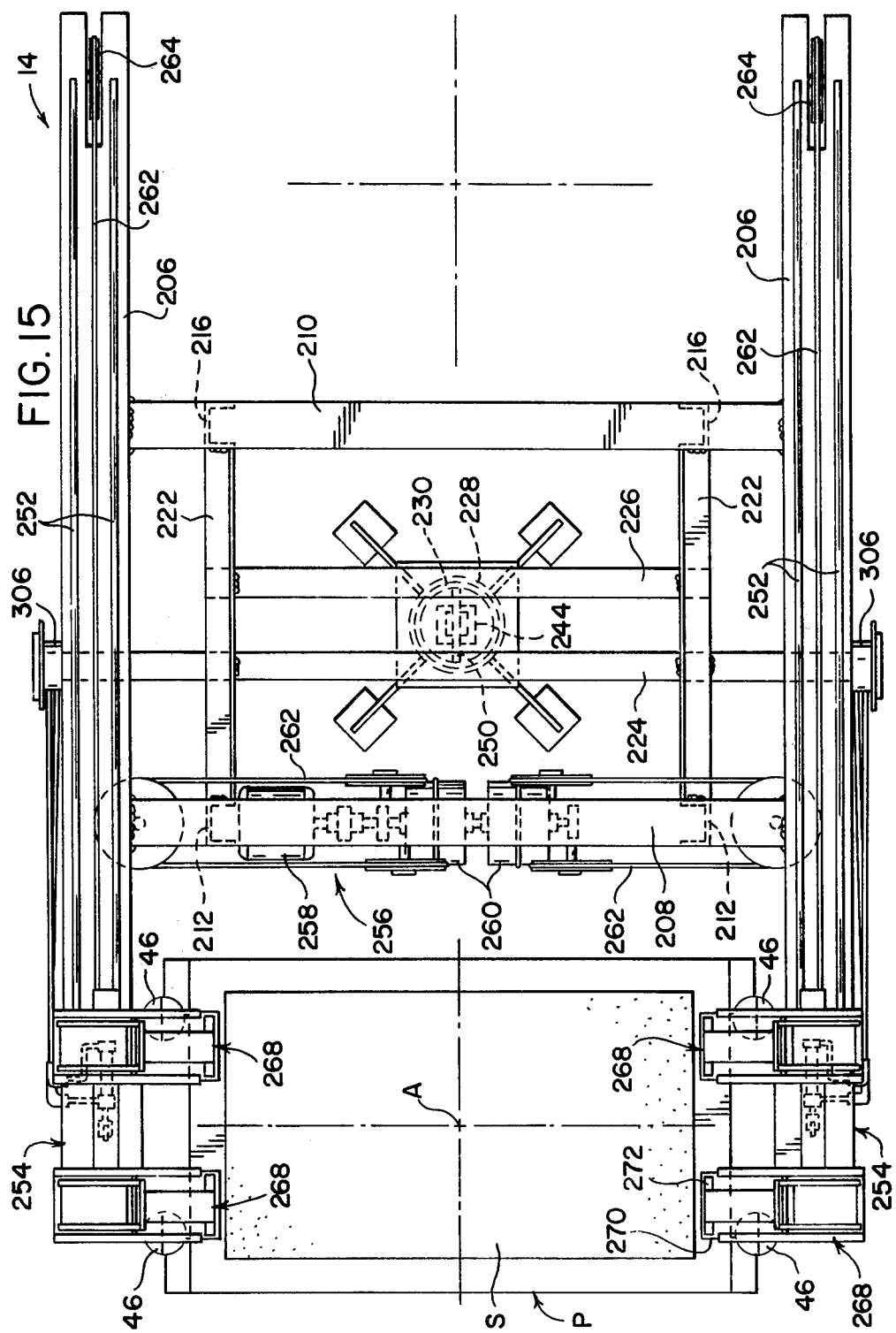
FIG. 15 is a plan view of a portion of the discharge mechanism as seen along line 15—15 in FIG. 14.
Figure 16:
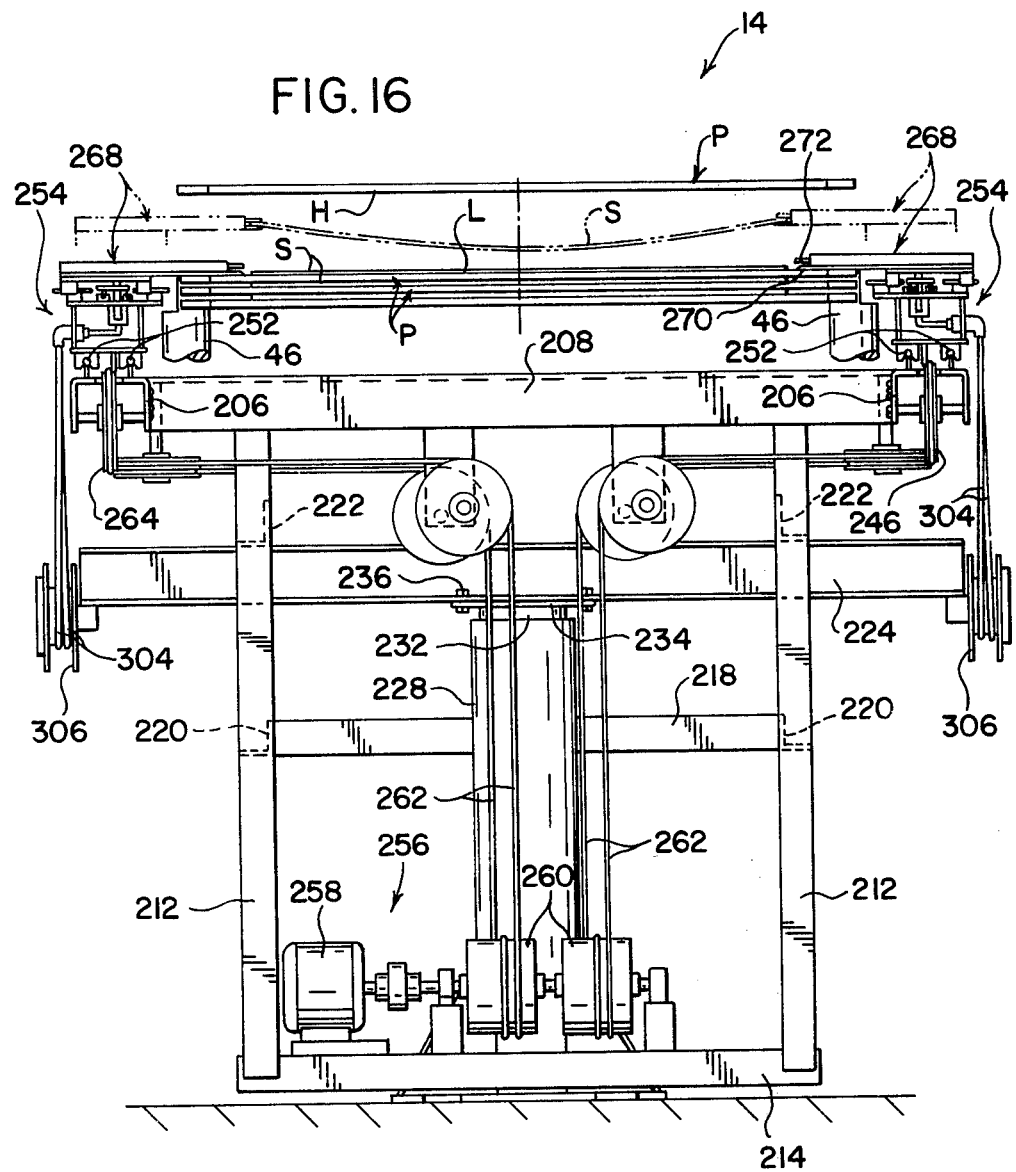
FIG. 16 is an end elevation view of the apparatus as seen along line 16—16 in FIG. 14.

Sheet discharge and transfer mechanism 14 by which heated plastic sheet material is removed from a platen and transferred out of the oven is illustrated in FIGS. 14–19 of the drawing. With reference first to FIGS. 14–16, discharge and transfer apparatus 14 includes a frame assembly comprised of longitudinally extending horizontal rail members 206 laterally spaced apart and interconnected intermediate their opposite ends by means of cross members 208 and 210. The frame assembly further includes a pair of frame members 212 depending from cross member 208 and interconnected at their lower ends by a cross member 214, and a pair of frame members 216 depending from cross member 210 and interconnected at their lower ends by means of a cross member 218. A pair of longitudinally extending frame members 220 interconnect the lower ends of the corresponding frame member 216 with the corresponding frame member 212 at a location intermediate the upper and lower ends of the latter, and a pair of longitudinally extending frame members 222 interconnect frame members 212 and 216 at a location spaced above frame members 220. The frame assembly further includes a pair of laterally extending beam members 224 and 226 extending beneath and fastened to frame members 222 and by which the frame assembly is adapted to be vertically elevated and lowered as a unit for the purpose which will become apparent hereinafter.

The frame assembly is supported for vertical displacement by means of a circular sleeve component 228 having its lower end suitably fastened rigidly to an underlying support structure. Sleeve 228 slidably supports an inner sleeve member 230 having an upper end 232 provided with a support plate 234 which is suitably attached thereto such as by welding and to which frame beams 224 and 226 are fastened such as by bolts 236. Vertical displacement of sleeve 230 and thus the frame assembly between the uppermost and lowermost positions thereof is limited by adjustable pin members 238. Pin members 238 are attached to support plate 234 and extend downwardly therefrom through openings in corresponding stop plates 240 on outer sleeve 228, and each pin is provided with a pair of nuts 242 to facilitate adjusting the limits of upward and downward displacement of the frame assembly. Vertical displacement is achieved by means of a hydraulic piston and cylinder unit in the lower end of support sleeve 228 and including a cylinder 244 having its lower end fastened to sleeve 228 by means of a cross member 246, and a piston rod 248 having its upper end interconnected with inner sleeve 230 by means of a cross member 250. It will be appreciated that cylinder 244 is connected to a suitable source of hydraulic fluid under pressure and thorough suitable controls, not shown, to facilitate the extension and retraction of piston rod 248 relative thereto and, thus, the vertical displacement of inner sleeve 230 and the frame assembly relative to support sleeve 228.

Figure 17:
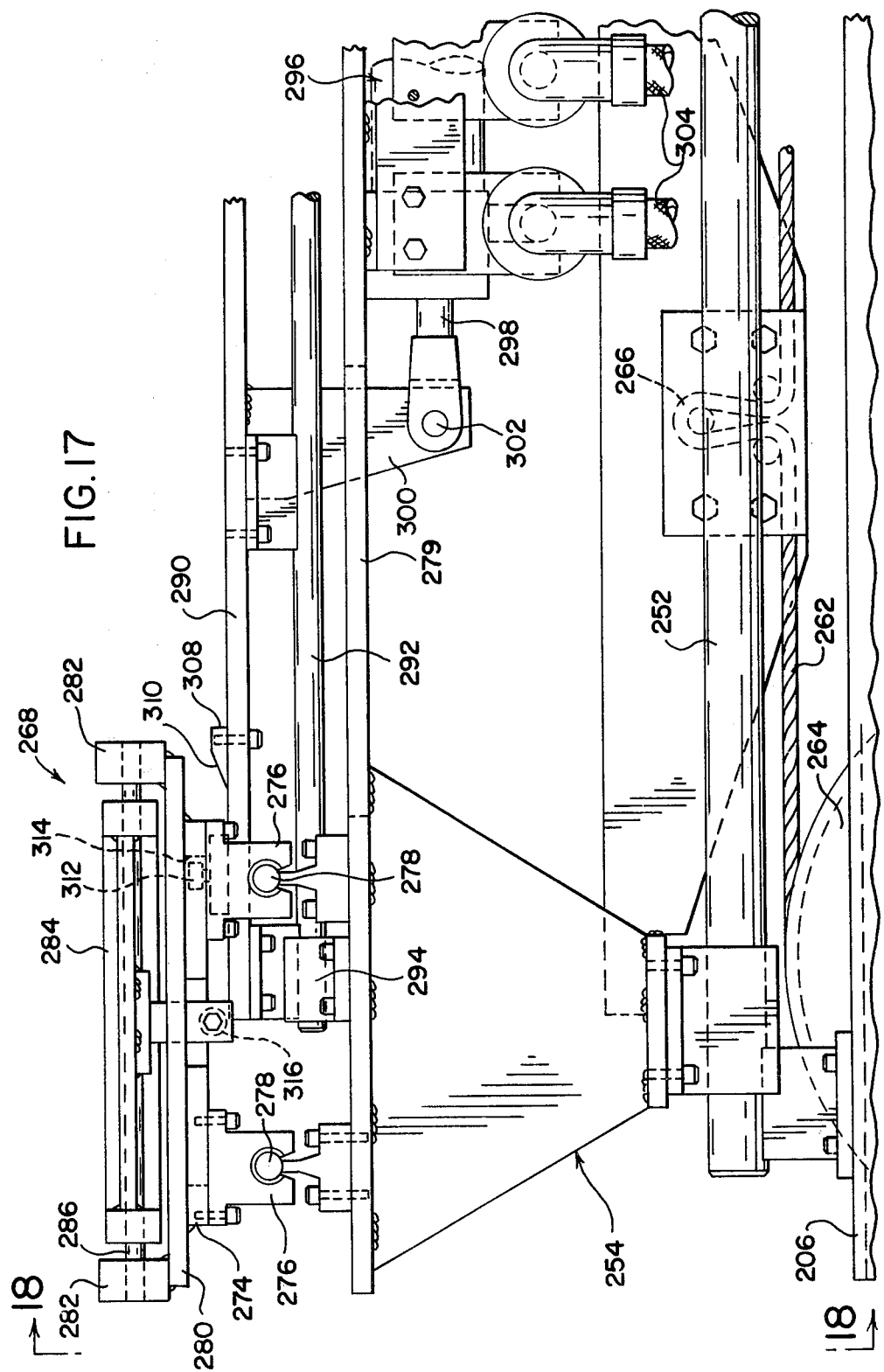
FIG. 17 is a detailed side elevation view of a feed finger assembly of the discharge apparatus.

Each of the frame rails 206 is provided with a pair of longitudinally extending guide track members 252 which are substantially coextensive therewith and which support a corresponding carriage assembly 254 for longitudinal displacement between the opposite ends of the guide tracks. Longitudinal displacement of the carriage assemblies between opposite ends of the guide tracks is achieved by means of a drive unit 256 supported on cross member 214 of the frame assembly for vertical displacement therewith. Drive unit 256 includes a reversible electric motor 258 operable to simultaneously rotate a pair of cable drums 260. Each cable drum is drivingly interconnected with a corresponding one of the carriage assemblies 254 by means of a corresponding cable 262 trained about the drum and a series of pulleys including pulleys 264 at longitudinally opposite ends of the corresponding frame rail 206. As best seen in FIG. 17, each cable 262 has a looped portion 266 interengaged with the underside of the corresponding carriage assembly against displacement relative thereto, whereby rotation of drums 260 in opposite directions operates to displace the corresponding carriage assembly 254 longitudinally of guide tracks 252 and in the direction corresponding to the direction of rotation of the cable drums.

Figure 18:
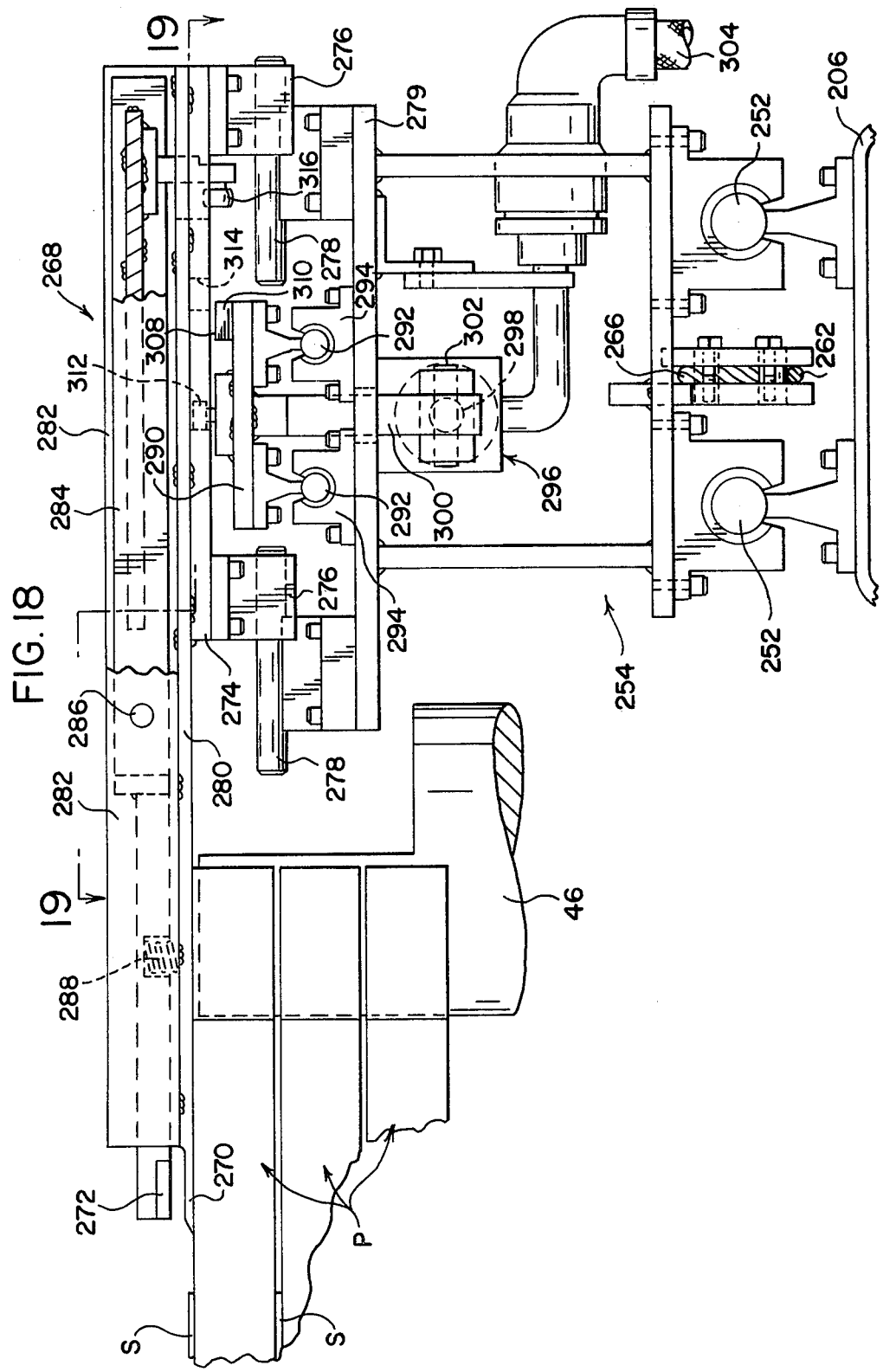
FIG. 18 is an end elevation view of the feed finger mechanism as seen along line 18—18 in FIG. 17.
Figure 19:
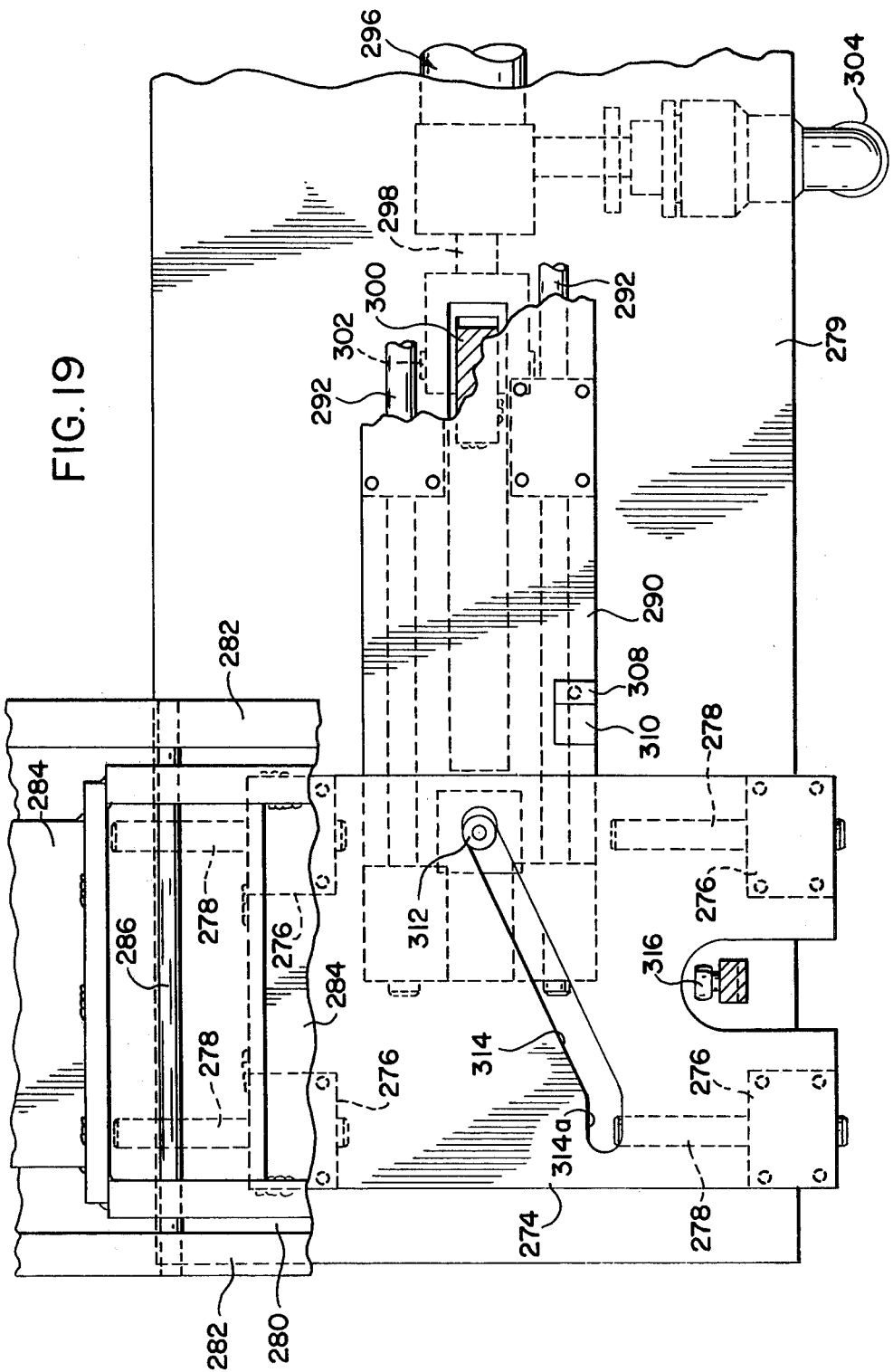
FIG. 19 is a sectional plan view taken along line 19—19 in FIG. 18.

Each of the carriage assemblies 254 supports a corresponding pair of longitudinally spaced apart feed finger units 268, each of which feed finger units is displaceable laterally inwardly and outwardly relative to the carriage assembly and includes lower and upper feed finger members 270 and 272, respectively. Feed fingers 270 and 272 are displaceable between open and closed positions relative to one another in conjunction with lateral inward and outward displacement. More particularly in this respect, as best seen in FIGS. 17-19 of the drawing, each feed finger unit 268 includes a support plate 274 provided with aligned pairs of guide components 276 slidably received on corresponding laterally extending guide components 278. Guide components 278 are mounted on a carriage support plate 279 and support the feed finger units for displacement laterally inwardly and outwardly relative to the carriage assembly. Each support plate 274 carries a laterally inwardly extending flat plate 280 for displacement therewith and the laterally inner end of which plate is tapered to a sharp edge to define lower feed finger components 270. Plate 280 supports a pair of laterally inwardly extending side members 282, and an upper feed finger plate 284 is disposed between side members 282 and pivotally interconnected therewith by means of a pin 286 intermediate the inner and outer ends of the side members. The laterally inner end of feed finger plate 284 provides upper feed finger member 272, and a biasing spring 288 is interposed between finger plates 280 and 282 to bias the latter plates upwardly so as to displace feed finger member 272 upwardly to an open position relative to feed finger member 270.

Lateral displacement of feed finger units 268 on each carriage assembly and displacement of the feed finger members between opened and closed positions is achieved simultaneously and by means of a cam plate member 290 which is longitudinally reciprocable relative to the corresponding carriage assembly and common to the pair of feed finger units 268 thereon. In this respect, cam plate 290 is mounted on a pair of guide rails 292 extending between the feed finger units 268 and which guide rails are slidably received in corresponding pairs of guide blocks 294 mounted on the carriage assembly. Longitudinal reciprocation of cam plate 290 relative to the carriage assembly is achieved by means of a pneumatic piston and cylinder unit mounted on the underside of carriage support plate 279 and including a cylinder 296 mounted on plate 279 for displacement therewith and a piston rod 298 displaceable relative to the cylinder. Piston rod 298 has its outer end coupled to cam plate 290 by means of a plate 300 attached to and depending from the cam plate and a pin 302 between the piston rod and plate. As will be appreciated from FIG. 14, the delivery of air under pressure to cylinder 296 to achieve displacement of piston rod 298 in opposite directions relative thereto is achieved by means of flexible air delivery hoses 304 connected to cylinder 296 and trained about a take up reel 306 on the corresponding end of frame beam 224. Reel 306 is operable to take up slack in the hoses during longitudinal displacement of the carriage along guide tracks 252, and it will be understood that the hoses are connected to a suitable source of air under pressure for controlling the delivery of air to and from cylinder 296 to achieve displacement of cam plate 290 relative to the carriage assembly and the corresponding feed finger unit.

As mentioned hereinabove, each cam plate 290 is common to the pair of feed finger units 268 on the corresponding carriage assembly. Accordingly, it will be appreciated that the following description with respect to the structure and operation of cam plate 290 and the feed finger unit shown in FIGS. 18 and 19 is applicable to the other feed finger unit 268 on the corresponding carriage assembly. With reference to the latter Figures, plate 290 carries a laterally extending cam member 308 on the upper surface thereof and having a tapered end portion 310 providing a cam surface. Plate 290 further carries a cam follower roller 312 which projects upwardly therefrom and is received in a follower slot 314 in support plate 274 of the feed finger unit. The laterally outer end of upper feed finger plate 284 is provided with a follower roller 316 therebeneath which extends through openings in bottom feed finger plate 280 and support plate 274 so as to be vertically positioned at the elevation of cam 308. Upon the introduction of air into cylinder 296 to achieve displacement of piston rod 298 to the left in FIG. 17, cam plate 290 is displaced to the left relative to feed finger unit 268, thus displacing roller 312 to the left in FIG. 19. The latter displacement of roller 312 imparts lateral inward displacement to support plate 274 and thus feed finger unit 268 relative to the carriage assembly, such inward displacement being completed when roller 312 reaches the entrance to terminal portion 314a of follower slot 314. At such time, lateral inwardly displacement of the feed finger unit has positioned follower roller 316 in the path of movement of cam surface 310 of cam 308, whereby continued displacement of cam plate 290 to the left in FIG. 19 displaces cam follower roller 316 upwardly to pivot upper feed finger plate 284 against the bias of spring 288 to close upper feed finger 272 against lower feed finger 270. Upon the introduction of air into cylinder 296 to achieve displacement of piston rod 298 to the right in FIG. 17, cam surface 310 first disengages follower roller 316, whereupon spring 288 biased upper feed finger plate 284 to displace feed finger 272 upwardly from feed finger 270, following which roller 312 exits from terminal portion 314a and operates to displace support plate 274 and thus the feed finger unit back to its laterally outer position.

It will be appreciated from FIG. 1 that the discharge and transfer mechanism 14 is positioned adjacent the output side of oven 10 such that the portions or rail members 206 of the discharge and transfer mechanism extending along laterally opposite sides of the stack of platens are accommodated between the platens and upright frame members 22 of the oven. As will be further appreciated from FIG. 16, the frame assembly of the sheet discharge and transfer mechanism, when in its lowermost position with respect to the vertical displacement capability thereof, positions the bottom surfaces of lower feed finger members 270 in the plane of pass line L. Thus, the feed finger members are in the plane of the upper surface of a platen P positioned at the pass line in connection with the separation of vertically adjacent platens to facilitate the discharge of the heated sheet from therebetween. When a platen P is so positioned, carriage units 254 and thus the corresponding feed finger units 268 are disposed laterally outwardly adjacent the sides of the platen with the feed finger units in the laterally outer positions relative to the carriage assemblies. Air cylinders 296 are then actuated to achieve displacement of cam plates 290 so as to simultaneously displace feed finger units 268 laterally inwardly with the upper and lower feed fingers in the open position, whereby the beveled inner edges of lower feed finger members 270 are displaced along the upper surface of the platen to extend under the side edges of plastic sheet S thereon. At the end of the inward travel of the feed finger units, cam plates 290 operate to pivot the upper feed finger plate as described above to displace upper feed finger members 272 downwardly, whereby the opposite edges of sheet S are clampingly engaged between the feed finger members. At this time, hydraulic fluid under pressure is introduced into cylinder 244 to elevate the frame assembly of the discharge and transfer mechanism and thus the carriages and feed finger units thereon, such elevation operating to achieve upward peeling of sheet S from the platen as shown by the broken line positions of the component parts in FIG. 16. Such peeling of the sheet from the platen avoids any interference with movement of sheet S outwardly from the oven, which interference might be caused by sticking or frictional contact between the sheet and platen. When the sheet and discharge assembly have been so elevated, drive motor 258 is actuated so as to rotate cable drums 260 in the direction which achieves displacement of carriage units 254 longitudinally toward the opposite ends of guide tracks 252, thus to transfer sheet S from the oven to press 16. When the carriage assemblies reach the opposite ends of guide tracks 252 sheet S is laterally and longitudinally positioned in the press for forming, whereupon cylinder 244 is actuated to lower the discharge and transfer assembly, and air cylinder 296 is actuated to achieve displacement of cam plate 290 so as to open feed fingers 270 and 272 and thence displace the feed finger units to the laterally outer positions thereof. Motor 258 is then actuated to rotate cable drums 260 in the direction to return carriage assemblies 254 and thus feed finger units 268 back to their positions laterally adjacent the platens in readiness for a subsequent sheet discharge operation.

Figure 20:
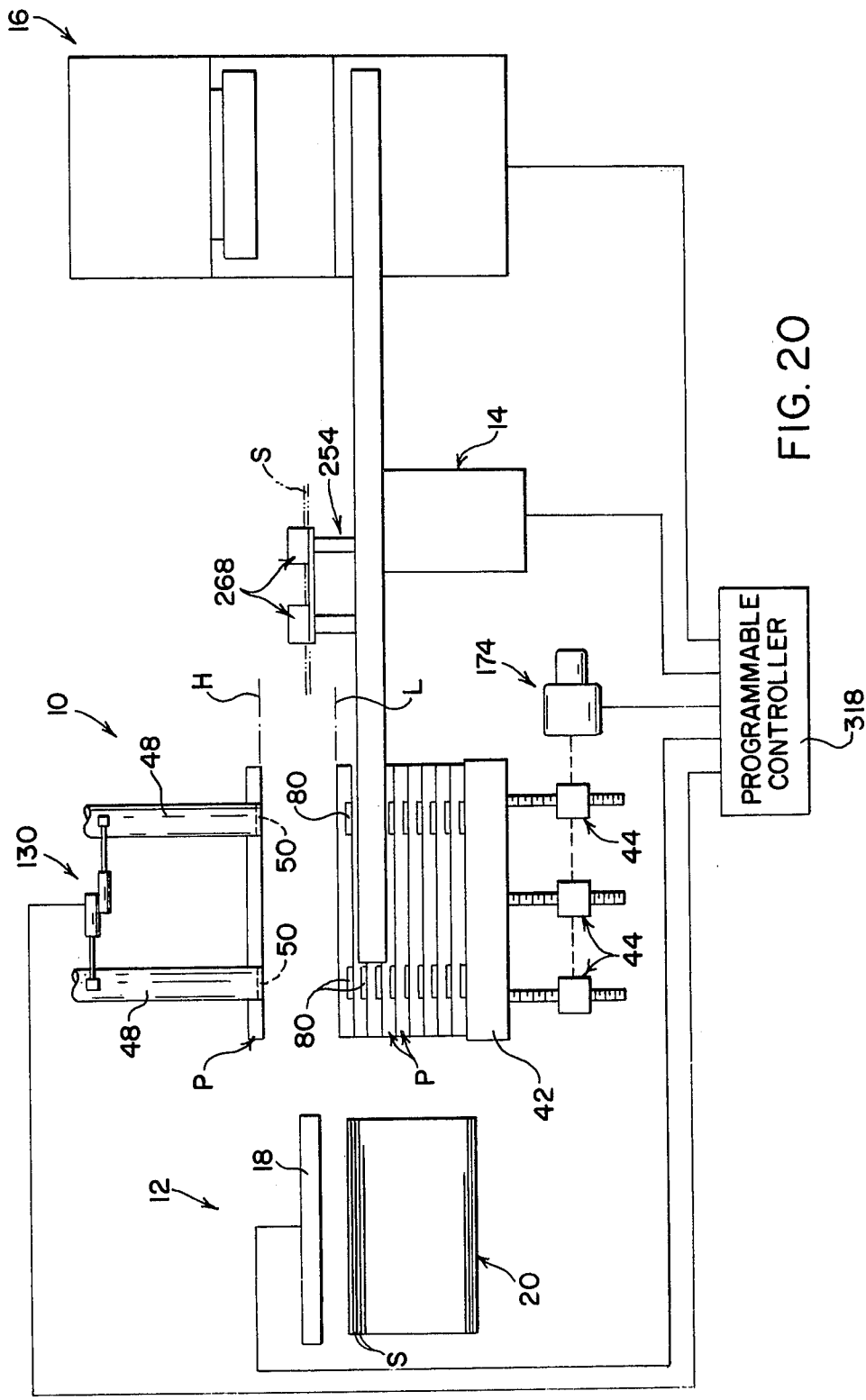
FIG. 20 is a schematic illustration of the apparatus and a control arrangement therefor in a production line operation.

FIG. 20 somewhat schematically illustrates the arrangement of oven 10, feed mechanism 12, discharge and transfer mechanism 14 and press 16 in connection with the progressive and continuous processing of plastic sheet material to form an article of manufacture. It is believed that the following description of the operation of the system in the embodiment disclosed herein will be readily understood from FIG. 20 in light of the foregoing description of the structures and operations of the various component parts thereof. In the disclosed embodiment, an article of manufacture such as a refrigerator liner is adapted to be continuously produced from sheets of plastic material such as polypropylene. In connection with such a continuous production process, oven 10 is provided with twenty-five platens individually heated for the plastic sheets between adjacent ones of the platens during the corresponding processing or soak time in the oven to be heated to a maximum temperature of about 350° F. Heating of the sheets in this respect is achieved by sequentially introducing sheets S in stack 20 between adjacent ones of the platens from one end of the stack thereof to the other in the manner to be described hereinafter, whereby the first sheet introduced is progressively heated for a soak time determined primarily by the time period required to load all of the platens in the stack. Thereafter, the heated sheets are removed from between adjacent platens in the same sequence as they were introduced and are sequentially delivered to press 16 for forming therein. Accordingly, it will be appreciated that the sequential removal provides for each sheet upon removal to have been heated for the same soak time in oven 10. Upon the removal of each sheet from between a pair of platens, a sheet to be heated is introduced therebetween, whereby the feeding, heating, transferring and forming of the plastic sheets is continuous.

It will be appreciated, as schematically illustrated in FIG. 20, that the various drive and operating mechanisms for feed mechanism 12, oven 10, discharge and transfer mechanism 14 and press 16 in connection with continuous operation of the system are adapted to be controlled, and the control thereof coordinated such as by a programmable controller 318. Such programmable controlling equipment for processing apparatus is well within the skill of the art and the details of the controller do not form a part of the present invention.

When the oven is prepared for an initial processing operation, presuming the platens to be numbered 1-25 from top to bottom, the first platen is latched in the holding position by the engagement of latch members 50 in latch receiving recesses 80 therein, platens 2-25 are supported by platform 42 with the upper surface of the second platen positioned at pass line L, and all of the platens are heated to the appropriate temperature by the circulation of hot oil therethrough. Through appropriate actuation of controller 318, feed mechanism 12 operates to pick up the top plastic sheet S from stack 20, to transfer the sheet into the oven and onto the upper surface of the second platen, and to return to its initial position over stack 20. During such return movement, the high speed motor of drive unit 174 for jack units 44 is actuated by controller 318 to elevate platform 42 and platens 2-25 toward holding position H and, just prior to engagement of the second platen with the gauge strips on the underside of the first platen, controller 318 is operable to stop the high speed motor of drive unit 174 and actuate the low speed motor thereof to move the second platen into engagement with the first platen at the lower speed. The latter dual speed operation minimizes the time of separation of the adjacent platens and avoids an impacting contact upon closing thereof. Upon engagement of the second platen with the gauge strips of the first platen controller 318 operates to deenergize the slow speed motor of drive unit 174 thus to hold platens 2-25 in the elevated position, and the controller further operates to actuate latch post drive unit 130 to achieve displacement of latch members 50 from the latched to the unlatched positions thereof. In response to movement of the latch members to the unlatched positions, controller 318 is operable to actuate the slow speed motor of drive unit 174 to elevate platens 1-25 to the level at which latch member receiving recesses 80 of the second platen are in alignment with latch members 50. Controller 318 then operates to actuate latch post drive unit 130 to displace latch members 50 from the unlatched to the latched positions thereof, hwereby the second platen becomes latched in holding position H with the first platen resting on top thereof. Controller 318 is then operable to actuate the high speed motor of drive mechanism 174 of jack units 44 to lower platform 42 and platens 3-25 so as to position the upper surface of the third platen at the pass line L. The preceding procedure is then repeated to achieve delivery of a sheet S into the space between the second and third platens, elevating of the third platen for latching thereof in the holding position, and lowering of the platens therebelow for the fourth platen to be positioned at the pass line L. This loading procedure is sequentially repeated until all of the platens 4-24 have received a plastic sheet and have been elevated for the twenty-fourth platen to be latched in holding position H with platens 1–23 supported thereabove.

When a plastic sheet has been introduced onto the last or twenty-fifth platen in the stack, and the twenty-fifth platen has been elevated into engagement with the twenty-fourth platen, controller 318 operates to actuate latch post drive unit 130 to displace latch members 50 to the unlatched positions thereof, and then operates to actuate drive unit 174 for jack units 44 to lower the entire stack of platens to the level at which the first platen is disposed in the holding position H. Controller 318 then operates to achieve latching of the first platen in the hold position and lowering of the stack to position the top surface of the second platen at pass line L. At this point, the plastic sheet between the first and second platens has been heated for the appropriate soak time to prepare the sheet for forming in press 16. Accordingly, upon movement of the second platen to the pass line position, sheet discharge and transfer mechanism 14 is actuated by controller 318 to achieve engagement of the feed fingers of feed finger units 268 with the opposite side edges of the plastic sheet, elevation of the transfer mechanism to strip the heated sheets from the platen, displacement of carriage mechanisms 254 to deliver the heated sheet to press 16 and thence operation of the feed finger mechanisms to release the sheet after which the press is operated to form the sheet. Following discharge of the plastic sheet from the oven, controller 318 actuates feed mechanism 12 to achieve delivery of a sheet from stack 20 onto the second platen, after which the second platen is elevated and latched in hold position H and the third platen lowered to pass line L as described hereinabove, whereupon the preceding discharge and transfer, forming and reloading operations are repeated. Accordingly, it will be appreciated that each plastic sheet upon discharge from the platen has been progressively heated for the same predetermined soak time and that, following the initial loading of all of the platens, the process becomes continuous.

While it is preferred to automate the process through the use of a programmable controller as described above, it will be appreciated that appropriate manual controls can be employed for achieving the various operations in the required sequence with respect to a continuous production line operation. It will be further appreciated that the apparatus can be operated either by manual control or by appropriate programming in a programmable controller to achieve heating of plastic sheets which are like or unlike in dimension and/or composition and in a manner whereby such sheets are introduced between adjacent platens and removed therefrom following a predetermined soak time in a sequence which is not progressive with respect to the numerical order of the platens in the stack. For example, the oven can be used to advantage in testing the formability of plastic sheets of the same material and dimensions heated for different soak times and, in connection with such operation, it will be appreciated that appropriate programming of a programmable controller can provide for any given pair of adjacent platens in the oven to be displaced, for the upper platen to be latched in holding position H, and the adjacent platen lowered to pass line L, to achieve loading and unloading thereof following any programmed time for heating of the sheet between the adjacent platens.

While considerable emphasis has been placed herein on the structures and structural interrelationship between component parts of the apparatus in the preferred embodiment, it will be appreciated that other embodiments, as well as changes in the preferred embodiments, can readily be made without departing from the principles of the present invention. Accordingly, it is to be distinctly understood that the foregoing descriptive matter is to be interpreted merely illustrative of the present invention and not as a limitation.

Having thus described the invention, it is claimed:

1. Apparatus for heating plastic sheet material comprising:
 a plurality of juxtaposed platens adapted to receive plastic sheet material therebetween and having a common axis transverse to the planes thereof;
 means to heat said platens;
 means to sequentially load and unload said platens, said last named means including means to position the platens of a selected pair of adjacent platens in axially spaced apart relationship to provide a sheet material feed and discharge space therebetween,
 adjacent platens other than said selected pair being juxtaposed when the platens of said selected pair are spaced apart, and
 means to feed and discharge sheet material relative to the spaced apart platens of said selected pair.

2. Apparatus according to claim 1, wherein said means to position the platens of a selected pair includes means to displace one of the platens of said pair to a first axial position and the other platen of said pair to a second axial position spaced from said first position, and means to hold said one platen in said first position.

3. Apparatus according to claim 2, wherein said common axis is vertical.

4. Apparatus according to claim 3, wherein said first axial position is above said second axial position, and said means to hold said one platen includes latch means releasably engaging said one platen in said first position.

5. Apparatus according to claim 4, wherein said means to displace said one and other platen of said pair includes platen support means and means to elevate and lower said platen support means relative to said first and second axial positions.

6. Apparatus according to claim 5, wherein said latch means is displaceable between latched and unlatched positions, and said apparatus includes means for displacing said latch means between said positions thereof, and means controlling said means for displacing said latch means and said means to elevate and lower said platen support means for said sequential loading and unloading of said platens to be vertically progressive in one direction and with respect to succeeding adjacent pairs of platens in said direction.

7. Apparatus according to claim 1, wherein said common axis is vertical, whereby the platens of said selected pair are vertically spaced apart to provide upper and lower platens, and wherein said means to feed and discharge plastic sheet material includes discharge gripper finger means, means supporting said gripper finger means for displacement between gripping and discharging positions relative to said lower platen, and in which positions said gripper finger means respectively grip a sheet of plastic material on said lower platen and position said sheet outside said lower platen, and means to displace said gripper finger means between said gripping and discharge positions.

8. Apparatus for heating plastic sheet material comprising:
 a plurality of vertically juxtaposed individual platens;

adjacent ones of said platens having opposed upper and lower surfaces adapted to receive plastic sheet material therebetween;

means to heat said platens;

vertically reciprocable platen support means;

means for displacing said platen support means to respectively position the upper and lower platens of a selected adjacent pair of said platens with the upper platen in a first position and the lower platen in a second position spaced below said upper platen;

latching means to releasably support said upper platen in said first position;

vertically adjacent ones of said platens other than said upper and lower platens of said selected pair being juxtaposed when said upper and lower platens are spaced apart; and means to feed and discharge plastic sheet material relative to said lower platen when the latter platen is in said second position.

9. Apparatus according to claim 8, including means on said platens providing a predetermined vertical spacing between the opposed upper and lower surfaces of juxtaposed ones of said platens.

10. Apparatus according to claim 8, including a coating of adhesion reducing material on said upper surfaces of said platens.

11. Apparatus according to claim 8, including means controlling said latching means and said means for displacing said platen support means to successively index individual platens vertically adjacent said upper platen to said first position and the corresponding lower platen to said second position.

12. Apparatus according to claim 8, wherein said means to feed and discharge plastic sheet material includes discharge gripper finger means, means supporting said gripper finger means for displacement between gripping and discharging positions relative to said lower platen and in which positions said gripper finger means respectively grip a sheet of plastic material on said lower platen and position said sheet outside said lower platen, and means to displace said gripper finger means between said gripping and discharge positions.

13. Apparatus according to claim 12, including means supporting said gripper finger means for vertical displacement relative to said lower platen when said gripper finger means is in said gripping position to displace said sheet of plastic material upwardly from contact with said lower platen.

14. Apparatus according to claim 8, wherein said means to feed and discharge plastic sheet material includes discharge gripper finger assemblies adjacent laterally opposite sides of said lower platen with respect to a direction of discharge, means supporting said gripper finger assemblies for horizontal displacement laterally between inner and outer positions relative to the corresponding side of said lower platen, said gripper finger assemblies including gripper fingers actuated to grip the corresponding edge of a sheet of material on said lower platen when said gripper finger assemblies are in said inner positions, means supporting said gripper finger assemblies for displacement upwardly from said inner position to an elevated position relative to said lower platen to displace corresponding side portions of said sheet from contact with said lower platen, and means supporting said gripper finger assemblies for displacement horizontally in said elevated position and in the direction of discharge to displace said sheet to a discharge position outside said lower platen.

15. Apparatus for heating plastic sheet material comprising:

a stack of vertically juxtaposed platens;

means to heat said platens;

adjacent ones of said platens having opposed upper and lower surfaces adapted to receive plastic sheet material therebetween;

means including upper and lower platen guide means providing vertically spaced apart upper and lower platen receiving areas, said stack having a vertical height and each of said areas having a height no less than said stack height, said platens in said stack being vertically displaceable relative to said receiving areas and being laterally supported and vertically guided by said upper and lower guide means when in the corresponding receiving area;

platen latch means at the lower end of said upper receiving area, said latch means being displaceable between holding and releasing positions relative to said platens;

feed and discharge means positioned to feed and discharge plastic sheet material along a path at the upper end of said lower receiving area;

vertically displaceable platen support means for elevating and lowering said platens relative to said latch means and said path; and means for displacing said platen support means and said platen latch means for said platen support means to sequentially position a selected one of said platens at said lower end of said upper receiving area and the adjacent lower platen at said path and for said latch means to hold said one platen at said lower end of said upper receiving area upon movement of said one platen thereto by said platen support means.

16. Apparatus according to claim 15, wherein said means for displacing said platen support means includes a plurality of screw jacks and means to selectively drive said screw jacks in opposite directions.

17. Apparatus according to claim 16, wherein each said screw jack includes a vertically disposed threaded screw member having an upper end, and means interengaging said upper end and said platen support means for relative lateral displacement therebetween.

18. Apparatus according to claim 17, wherein said means interengaging said upper end includes a collar mounted on said upper end and including radially outwardly extending flange means slidably engaging said platen support means, and retaining ring means mounted on said platen support means and including skirt means spaced radially outwardly of said flange means.

19. Apparatus according to claim 15, wherein said lower guide means includes vertically extending lower guide posts, and guide means on said platens slidably engaging said lower guide posts.

20. Apparatus according to claim 15, wherein said upper guide means includes vertically extending upper guide posts, and guide means on said platens slidably engaging said upper guide posts.

21. Apparatus according to claim 20, wherein said upper guide posts have lower ends at said lower end of said upper receiving area, and said latch means includes a latch member on the lower end of each upper guide posts.

22. Apparatus according to claim 21, wherein said upper guide posts are circular and said guide means on said platens are arcuate, means supporting said upper guide posts for pivotal movement about the vertical axes thereof, said latch members being attached to the corresponding guide post for pivotal displacement therewith, and said means to displace said latch means including means to pivot said upper guide posts about said axes thereof.

23. Apparatus according to claim 22, wherein said lower guide means includes circular lower guide posts vertically aligned with said upper guide posts to slidably engage said guide means in said platens.

24. Apparatus according to claim 15, wherein said platens include spacer means interengaging between adjacent juxtaposed platens to maintain said opposed upper and lower surfaces in a predetermined spaced relationship.

25. Apparatus according to claim 24, wherein said upper surfaces of said platens are coated with an adhesion restraining material.

26. Apparatus according to claim 15, wherein said feed and discharge means includes discharge gripper finger assemblies on laterally opposite sides of said feed and discharge path, means supporting said gripper finger assemblies for horizontal displacement laterally between inner and outer positions relative to said lower platen, said gripper finger assemblies including gripper fingers actuated to grip the corresponding edge of a sheet of material on said lower platen when said gripper finger assemblies are in said inner positions, means supporting said gripper finger assemblies for displacement upwardly from said inner position to an elevated position relative to said lower platen to displace corresponding side portions of said sheet from contact with said lower platen, and means supporting said gripper finger assemblies for displacement horizontally in said elevated position and in the direction of said path to displace said sheet to a discharge position outside said lower platen.

27. Apparatus according to claim 26, wherein said upper and lower guide means include upper and lower vertically aligned guide posts, said platens including arcuate guide means slidably engaging said upper and lower guide posts, said upper guide posts having lower ends at said lower end of said upper receiving area, said latch means including a latch member at the lower end of each said upper guide post and pivotal about the corresponding post axis, and said means to displace said latch means including means to pivot each said latch member about said corresponding post axis.

28. Apparatus according to claim 27, including means supporting each said upper guide post for pivotal movement about its axis, said latch members being attached to the corresponding post for pivotal movement therewith, and said means to pivot said latch members including means to pivot said upper posts about the axes thereof.

29. A method of heating a plurality of sheets of plastic material between adjacent ones of a plurality of juxtaposed platens comprising:
heating said platens;
opening and closing the platens of a plurality of pairs of adjacent platens in said stack in a first sequence with respect to said pairs while maintaining the remaining platens in said stack juxtaposed during each said opening and closing;
introducing a sheet of plastic material between each said pairs of platens while open;
reopening and reclosing said pairs of platens in a second sequence and maintaining the remaining platens in said stack juxtaposed during each reopening and reclosing; and
removing the sheet of plastic material from between each said pairs of platens while reopened.

30. The method according to claim 29, wherein said first and second sequences are the same with respect to said pairs of platens.

31. The method according to claim 29, wherein said plurality of pairs of adjacent platens are defined by immediately adjacent ones of said plurality of platens and said first sequence is successive with respect thereto.

32. The method according to claim 31, wherein said second sequence is the same as said first sequence.

33. The method according to claim 29, and introducing and removing said plastic sheets along a path fixed with respect to said plurality of platens, and displacing said platens to position said pairs of platens relative to said path in said first and second sequences.

34. The method according to claim 33, wherein said path is horizontal, said plurality of platens is a vertical stack, and each of said first and second sequences is progressive and in the same vertical direction relative to said path.

35. The method according to claim 34, wherein said plurality of pairs of adjacent platens are defined by immediately adjacent ones of said platens in said stack and each said first and second sequence is successive with respect thereto.

* * * * *

UNITED STATES PATENT AND TRADEMARK OFFICE
CERTIFICATE OF CORRECTION

PATENT NO. : 4,431,404
DATED : February 14, 1984
INVENTOR(S) : John F. Cobb; John W. Martin It is certified that error appears in the above—identified patent and that said Letters Patent are hereby corrected as shown below:

On the cover page, Item [73] Assignee:, after "Benton Harbor" insert --- , Michigan, and Gulf & Western Manufacturing Company, Southfield, Michigan ---.

Signed and Sealed this

Nineteenth Day of February 1985

[SEAL]

Attest:

DONALD J. QUIGG

Attesting Officer

Acting Commissioner of Patents and Trademarks